US012345339B2

(12) United States Patent
Herkimer et al.

(10) Patent No.: US 12,345,339 B2
(45) Date of Patent: Jul. 1, 2025

(54) MULTI-WAY VALVE

(71) Applicant: Textron Innovations, Inc., Providence, RI (US)

(72) Inventors: Robert Herkimer, Savannah, GA (US); Sofia C. Salas, Denton, TX (US); Ashten M. Cole, Grapevine, TX (US); Shahryar Fotovati, Frisco, TX (US)

(73) Assignee: Textron Innovations, Inc., Providence, RI (US)

( * ) Notice: Subject to any disclaimer, the term of this patent is extended or adjusted under 35 U.S.C. 154(b) by 0 days.

(21) Appl. No.: 18/463,077

(22) Filed: Sep. 7, 2023

(65) Prior Publication Data

US 2025/0084926 A1 Mar. 13, 2025

(51) Int. Cl.
*F16K 11/076* (2006.01)
(52) U.S. Cl.
CPC .................................. *F16K 11/076* (2013.01)
(58) Field of Classification Search
CPC ..................................................... F16K 11/076
USPC ............ 137/625.45, 625.15, 625.19, 625.23, 137/625.41, 625.46
See application file for complete search history.

(56) References Cited

U.S. PATENT DOCUMENTS

| 3,499,467 | A | * | 3/1970 | Lang, Jr. | ............. | F16K 11/0836 |
| | | | | | | 137/625.19 |
| 4,021,190 | A | * | 5/1977 | Dickson | ................... | F23N 1/087 |
| | | | | | | 431/280 |
| 5,617,815 | A | * | 4/1997 | Spies | ................... | F16K 11/0853 |
| | | | | | | 123/41.1 |
| 6,152,176 | A | * | 11/2000 | Lin | ..................... | A61G 7/05776 |
| | | | | | | 137/625.21 |
| 6,245,233 | B1 | * | 6/2001 | Lu | ........................... | B01D 24/12 |
| | | | | | | 210/425 |
| 6,345,645 | B1 | * | 2/2002 | Kenna | ................... | F16K 11/085 |
| | | | | | | 137/625.11 |
| 6,539,899 | B1 | * | 4/2003 | Piccirilli | .................. | F01P 7/167 |
| | | | | | | 123/41.1 |
| 7,506,664 | B2 | * | 3/2009 | Norris | ................. | F16K 11/0876 |
| | | | | | | 137/625.42 |
| 9,481,477 | B2 | * | 11/2016 | Kjar | ........................ | C12M 23/40 |
| 11,773,990 | B2 | * | 10/2023 | Koch | .................. | F16K 11/0853 |
| | | | | | | 137/1 |
| 2006/0118066 | A1 | * | 6/2006 | Martins | ............... | F16K 11/0856 |
| | | | | | | 123/41.08 |
| 2014/0053931 | A1 | * | 2/2014 | Whitaker | ............ | F16K 11/0853 |
| | | | | | | 137/625.17 |
| 2015/0354716 | A1 | * | 12/2015 | Morein | ............... | F16K 11/0853 |
| | | | | | | 137/625.47 |

(Continued)

*Primary Examiner* — Minh Q Le
(74) *Attorney, Agent, or Firm* — Whitaker Chalk Swindle & Schwartz PLLC; Enrique Sanchez, Jr.; Juan Vasquez

(57) ABSTRACT

Multi-way valves for conditioned airflow control systems. In embodiments, a multi-way valve includes an intake configured to receive an airflow as in input to the multi-way valve, a plurality of outlets, each of the plurality of outlets configured to provide at least a portion of the airflow as an output of the multi-way valve, a gate assembly including a gate opening configured to allow air to flow through the gate opening, and an actuator configured to move the gate assembly to a position configured to allow the airflow to concurrently flow through the gate opening to a first set of outlets of the plurality of outlets while preventing the airflow from flowing to a second set of outlets of the plurality of outlets.

14 Claims, 18 Drawing Sheets

(56) References Cited

U.S. PATENT DOCUMENTS

| | | | |
|---|---|---|---|
| 2016/0319952 A1* | 11/2016 | Geffert | F16K 31/043 |
| 2017/0152957 A1* | 6/2017 | Roche | B60L 58/26 |
| 2017/0328483 A1* | 11/2017 | Vanderhoff | F16K 11/076 |
| 2018/0292016 A1* | 10/2018 | Ledvora | F16K 5/0471 |
| 2019/0249787 A1* | 8/2019 | Whitaker | F16K 11/076 |
| 2020/0200284 A1* | 6/2020 | Ledvora | F16K 5/0471 |
| 2022/0010883 A1* | 1/2022 | Willey | F02D 35/00 |
| 2024/0125399 A1* | 4/2024 | Grissom | F16K 11/076 |

* cited by examiner

MULTI-WAY VALVE

STATEMENT REGARDING FEDERALLY SPONSORED RESEARCH OR DEVELOPMENT

This invention was made with Government support under Agreement No. W911W6-19-9-0002, awarded by the Army Contracting Command-Redstone Arsenal. The Government has certain rights in the invention.

TECHNICAL FIELD

The present disclosure generally relates to environment control units (ECUs), and more specifically to multi-way valves configured for granular airflow distribution.

BACKGROUND

Controlling the direction and/or distribution of an airflow throughout a system is a significant feature in many applications. This feature becomes particularly significant in vehicle applications (e.g., aircraft, automobiles, etc.) where maintaining an optimal temperature and humidity level in the cabin is not just a matter of comfort but also a vital factor for safety. Precise control over the direction and/or distribution of the conditioned airflow can significantly improve the conditions within the cabin or cockpit. For example, effective control of a conditioned airflow may allow us to ensure that a cockpit of an aircraft is at a comfortable temperature, but also may allow us to distribute the conditioned airflow to defog components, such as instruments and/or the canopy to ensure proper visibility.

However, current systems exhibit several deficiencies that restrict their efficiency and reliability in achieving optimal airflow control. The limitations of current designs are particularly problematic under cold weather conditions when additional issues such as ice accumulation may compound visibility problems. Conversely, during hot weather conditions, the inability of current systems to deliver sufficient cooling air to the pilots can hamper their comfort and, in extreme situations, could risk their safety.

Current conditioned airflow systems in many aircraft applications feature the use of two-way valves for controlling the flow of conditioned air. In these implementations, the conditioned airflow is directed to either the pilot's torso or to the canopy, but not to both concurrently, due to the design of two-way valves. This restricts the ability of current systems to optimize the cabin or cockpit conditions. Further exacerbating the problem with current designs is the fact that these systems continuously bleed off a fixed percentage of the total conditioned airflow towards the pilots' feet, and the fixed percentage is not adjustable. The limitations of current two-way valve designs inhibit the system's ability to provide full heating to defog the canopy, complete cooling to maintain pilots' comfort, or total warmth to the pilots' feet and the cockpit.

The two-way valve design not only restricts adequate control but also introduces issues associated with backpressure due to the sharp turns in the airflow path. These issues compound the limitations of the system and degrade the efficiency and reliability of the conditioned airflow control.

Comparatively, many automobile applications use a three-valve system in which three separate valves are used to control the direction and/or distribution of the conditioned airflow. Each of these valves is positioned at one of the three outlets and can be adjusted to open or close, enabling or restricting airflow to the corresponding outlet. While this design provides improved control over the airflow compared to the two-way valve systems, it introduces its own set of complications. For example, a significant downside of this three-valve design is its complexity, since the use of multiple independent valves requires intricate control mechanisms and installation procedures. This design also inherently raises the overall cost of the system due to the additional components and the complexity of their installation and maintenance. Furthermore, the three-valve system imposes a weight and/or a space penalty, which is especially problematic in aircraft applications in which space and/or weight come at a premium.

Therefore, existing conditioned airflow control systems, whether employing a two-way valve design or a more complex three-valve design, exhibit significant limitations. These limitations include an inability to provide optimal heating or cooling to the cabin or cockpit, restricted control over the direction and/or distribution of airflow, complex design and installation procedures, higher costs, increased weight and/or space requirements, etc.

SUMMARY

The present disclosure achieves technical advantages as systems and methods that provide multi-way valves for conditioned airflow control systems. In particular embodiments, an intake may be configured to receive an airflow as in input to the multi-way valve, and each outlet of a plurality of outlets may be configured to provide at least a portion of the input airflow as an output of the multi-way valve. In embodiments, a multi-way valve may include a gate assembly that includes a gate opening configured to allow air to flow through the gate opening, and an actuator configured to move the gate assembly to a position configured to allow the airflow to concurrently flow through the gate opening to a first set of outlets of the plurality of outlets while preventing the airflow from flowing to a second set of outlets of the plurality of outlets. For example, the actuator may rotate the gate assembly to a position in which the gate opening may be positioned over a single outlet of the plurality of outlets (e.g., allowing the entirety of the airflow to flow through the single outlet), may be positioned to overlap at least two adjacent outlets (e.g., allowing a respective portion of the airflow to flow through each of the at least two adjacent outlets), or may be positioned over at least a portion of a first outlet while an end of the wall of the gate assembly is positioned partially over a second outlet, the first and second outlets being non-adjacent (e.g., allowing a respective portion of the airflow to flow through each of the first and second non-adjacent outlets).

In some embodiments, an interface is provided for an operator to select an airflow distribution mode from a plurality of airflow distribution modes. Each airflow distribution mode of the plurality of airflow distribution modes may define, or correspond to, a different set of outlets of a plurality of outlets to which the airflow is to be distributed. For example, a first airflow distribution mode of the plurality of airflow distribution modes may define a first set of outlets to which the airflow is to be distributed, while a second airflow distribution mode of the plurality of airflow distribution modes may define a second set of outlets to which the airflow is to be distributed, the first and second set of outlets being different. In some embodiments, the multi-way valve may be used in aircraft applications and the plurality of airflow distribution modes may include at least one distribution mode that corresponds to a set of outlets distributing the airflow to one or more of: the torso of the aircraft's pilot entirely, the feet of the aircraft's pilot and the torso of the aircraft's pilot concurrently, the feet of the aircraft's pilot entirely, the feet of the aircraft's pilot and the canopy of the aircraft concurrently, the canopy of the aircraft entirely, and the torso of the aircraft's pilot and the canopy of the aircraft concurrently.

In this manner, a multi-way valve implemented in accordance with embodiments of the present disclosure may provide a granular control of the direction and distribution of conditioned air while mitigating and/or providing the issues that arise with current implementations of conditioned airflow control systems as described above. For example, in aircraft applications, the multi-way valve of embodiments can facilitate delivery of the substantial entirety of a conditioned airflow to the pilot's torso, pilot's feet, or the canopy, and/or split the conditioned airflow between any combination thereof. During cold weather operations, granular control of the direction and distribution of conditioned air using the multi-way valve of embodiments may facilitate and/or expedite canopy defogging and may reduce ice accumulation on the canopy. During hot weather operation, granular control of the direction and distribution of conditioned air using the multi-way valve of embodiments may facilitate delivery of 100% air-conditioned airflow to the pilot's torso. During moderate weather, granular control of the direction and distribution of conditioned air using the multi-way valve of embodiments may enable the pilot to select a distribution mode for directing the conditioned airflow to the pilot's feet, torso, or canopy, and/or to split the conditioned airflow between any combination thereof.

Furthermore, as the multi-way valve of embodiments allows the entirety of the input conditioned airflow to be provided to the multi-way valve, which eliminates the use of duct junctions upstream, consequently lowering the backpressure within the system and increasing the conditioned airflow delivery without requiring an increase of fan capacity over existing airflow control systems. In particular, the design of the multi-way valve of embodiments enables the reduction of internal backpressure over similar implementations using traditional two-way valves.

It is an object of the disclosure to provide a multi-way valve for airflow control. It is a further object of the disclosure to provide a system for controlling an airflow and a method of manufacturing a multi-way valve for airflow control. These and other objects are provided by the present disclosure, including at least the following embodiments.

In one particular embodiment, a multi-way valve for airflow control is provided. The multi-way valve includes an intake configured to receive an airflow as in input to the multi-way valve, a plurality of outlets, each of the plurality of outlets configured to provide at least a portion of the airflow as an output of the multi-way valve, a gate assembly including a gate opening configured to allow air to flow through the gate opening, and an actuator configured to move the gate assembly to a position configured to allow the airflow to concurrently flow through the gate opening to a first set of outlets of the plurality of outlets while preventing the airflow from flowing to a second set of outlets of the plurality of outlets.

In another embodiment, a system for controlling an airflow is provided. The system includes an airflow source configured to provide an airflow to be routed to a set of outlets of a plurality of outlets and an interface configured to allow selection of an airflow distribution mode from a plurality of airflow distribution modes. In embodiments, each airflow distribution mode of the plurality of airflow distribution modes may define a different set of outlets of a plurality of outlets to which the airflow is to be distributed. The system also includes a multi-way valve configured to route the airflow from the airflow source to a selected set of outlets of the plurality of outlets corresponding to the selected airflow distribution mode. In embodiments, the multi-way valve ma include a gate assembly including a gate opening configured to allow air to flow through the gate opening, and an actuator configured to move the gate assembly to a position configured to allow the airflow to concurrently flow through the gate opening to the selected set of outlets of the plurality of outlets while preventing the airflow from flowing to a second set of outlets of the plurality of outlets, wherein the first set of outlets and the second set of outlets represent an entirety of the plurality of outlets.

In still another embodiment, a method of manufacturing a multi-way valve for airflow control is provided. The method includes configuring an intake to receive an airflow as in input to the multi-way valve, including a plurality of outlets, each of the plurality of outlets configured to provide at least a portion of the airflow as an output of the multi-way valve, disposing a gate assembly within the multi-way valve, the gate assembly including a gate opening configured to allow air to flow through the gate opening, and configuring an actuator to move the gate assembly to a position configured to allow the airflow to concurrently flow through the gate opening to a first set of outlets of the plurality of outlets while preventing the airflow from flowing to a second set of outlets of the plurality of outlets.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

Figure 1A:
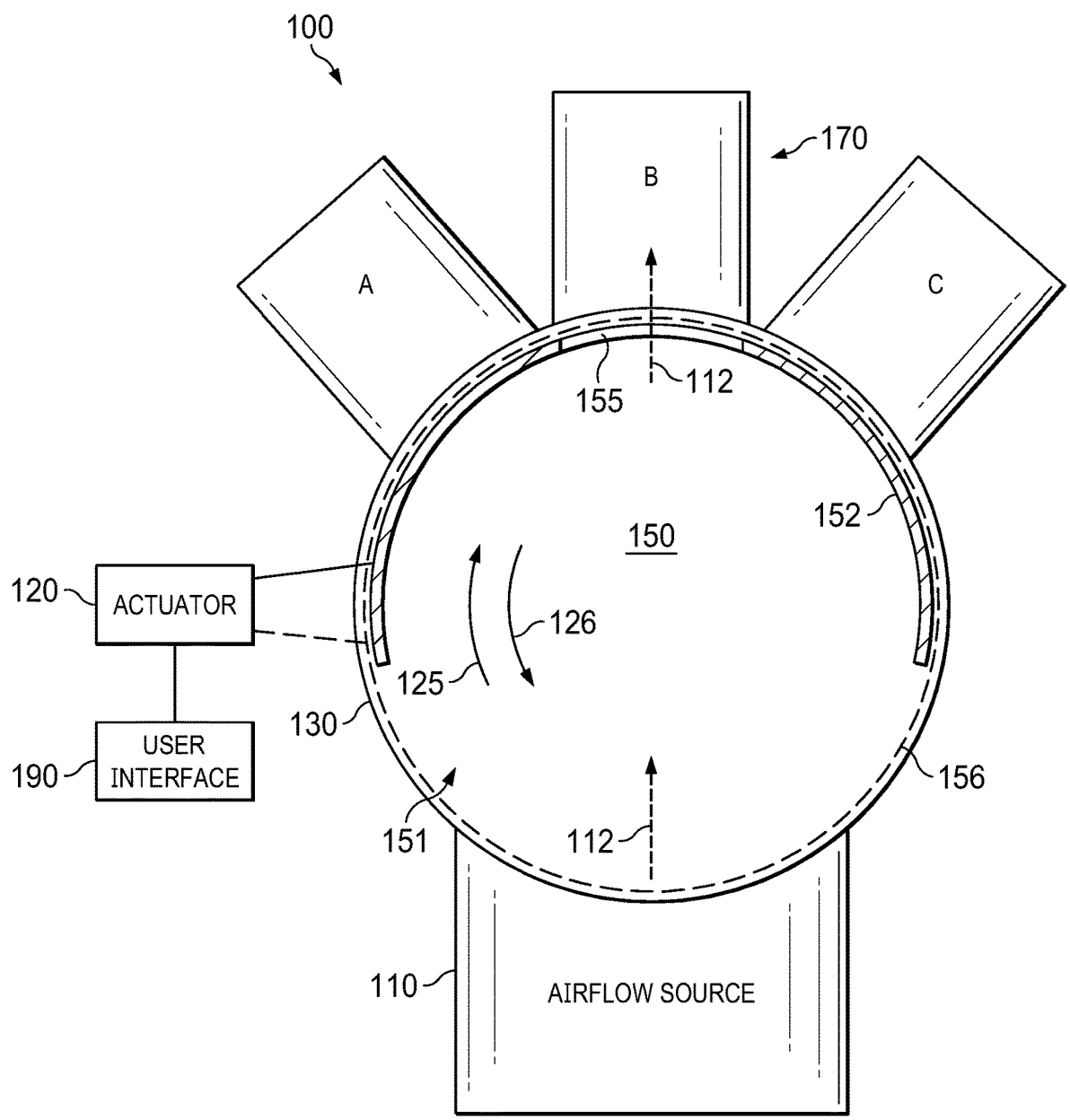
FIG. 1A is a diagram of an exemplary system configured with capabilities and functionality for implementing a multi-way valve in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Various embodiments of the present disclosure are directed to multi-way valves for conditioned airflow control systems. In particular embodiments, an intake may be configured to receive an airflow as in input to the multi-way valve, and each outlet of a plurality of outlets may be configured to provide at least a portion of the input airflow as an output of the multi-way valve. In embodiments, a multi-way valve may include a gate assembly that includes a gate opening configured to allow air to flow through the gate opening, and an actuator configured to move the gate assembly to a position configured to allow the airflow to concurrently flow through the gate opening to a first set of outlets of the plurality of outlets while preventing the airflow from flowing to a second set of outlets of the plurality of outlets. For example, the actuator may rotate the gate assembly to a position in which the gate opening may be positioned over a single outlet of the plurality of outlets (e.g., allowing the entirety of the airflow to flow through the single outlet), may be positioned to overlap at least two adjacent outlets (e.g., allowing a respective portion of the airflow to flow through each of the at least two adjacent outlets), or may be positioned over at least a portion of a first outlet while an end of the wall of the gate assembly is positioned partially over a second outlet, the first and second outlets being non-adjacent (e.g., allowing a respective portion of the airflow to flow through each of the first and second non-adjacent outlets).

In some embodiments, an interface is provided for an operator to select an airflow distribution mode from a plurality of airflow distribution modes. Each airflow distribution mode of the plurality of airflow distribution modes may define, or correspond to, a different set of outlets of a plurality of outlets to which the airflow is to be distributed. For example, a first airflow distribution mode of the plurality of airflow distribution modes may define a first set of outlets to which the airflow is to be distributed, while a second airflow distribution mode of the plurality of airflow distribution modes may define a second set of outlets to which the airflow is to be distributed, the first and second set of outlets being different. In some embodiments, the multi-way valve may be used in aircraft applications and the plurality of airflow distribution modes may include at least one distribution mode that corresponds to a set of outlets distributing the airflow to one or more of: the torso of the aircraft's pilot entirely, the feet of the aircraft's pilot and the torso of the aircraft's pilot concurrently, the feet of the aircraft's pilot entirely, the feet of the aircraft's pilot and the canopy of the aircraft concurrently, the canopy of the aircraft entirely, and the torso of the aircraft's pilot and the canopy of the aircraft concurrently.

It is noted that although the present disclosure may focus on a particular application in which the multi-way valve of embodiments may be used to control an airflow of conditioned air in a vehicle (e.g., an aircraft (e.g., a rotary wing aircraft (e.g., a helicopter, vertical takeoff and landing (VTOL) aircraft, etc.), as part of a main propeller of a fixed wing aircraft, etc.)), this is for illustrative purposes and it is not intended to be limiting in any way. Indeed, the multi-way valve of embodiments may be used in other applications involving control of an airflow, such as in home systems, etc.

FIG. 1A is a diagram of an exemplary system 100 configured with capabilities and functionality for implementing a multi-way valve in accordance with embodiments of the present disclosure. As shown in FIG. 1A, system 100 may include airflow source 110, gate assembly 150, actuator 120, housing 130, a plurality of outlets 170, and user interface 190. In embodiments, these components of system 100 may cooperatively operate to provide granular control of the direction and/or distribution of airflow 112 provided by airflow source 110 to a set of outlets of the plurality of outlets 170 based on a selected distribution mode in accordance with the present description.

It is noted that in embodiments, the multi-way valve described herein may include one or more components of system 100. For example, in some embodiments, the multi-way valve may include gate assembly 150 (e.g., including gate wall 152 and gate opening 155), housing 130, actuator 120, outlets A, B, and C, other components of system 100, or any combination thereof.

In embodiments, airflow source 110 may represent a source from which airflow 112 is provided. Airflow source 110 may be an environmental control unit (ECU), a blower, etc. and airflow 112 may represent an airflow of air conditioned (e.g., cooled, heated, and/or dehumidified) by airflow source 110. In embodiments, airflow source 110 may be functionally coupled to an intake of housing 130ro facilitate airflow 112 from flowing into main chamber 151. In embodiments, airflow 112 may represent the airflow that is to be directed and/or distributed to one or more of outlets 170 (e.g., outlets A, B, and C).

Housing 130 may be configured to provide a structural support for mounting and/or installation of other components of system 100 (e.g., gate assembly 150, etc.). Housing 130 may represent a plenum that is configured to function as an enclosure to not only protect components of system 100, but also to provide a mechanism to distribute airflow 112 to one or more of outlets 170. For example, in embodiments, housing 130 may include, implement, or otherwise define main chamber 151, which may represent a channel interior to housing 130 through which airflow 112 may flow from airflow source 110 to one of the plurality of outlets 170 via gate assembly 150. In embodiments, main chamber 151 may be defined by the walls and/or shape of housing 130 and may include gate assembly 150, such that airflow 112 may flow through gate assembly 150 and out of gate assembly 150 into one or more of outlets A, B, and C. In embodiments, housing 130 may have a substantially round shape, a half-moon shape, a cylindrical shape, a scoop shape, etc.

In embodiments, housing 130 may include or be coupled to plurality of outlets 170. Plurality of outlets 170 may include outlets A, B, and C and may be configured to allow airflow 112 to flow through one or more outlets A, B, and/or C, alone or in combination, as an output of system 110. In embodiments, each of outlet A, B, and C. may be configured to route the airflow flowing therethrough to a different location, such as a different part of a cabin or cockpit. For example, outlet A may be configured to route the airflow flowing therethrough to the pilot's torso, outlet B may be configured to route the airflow flowing therethrough to the pilot's feet, and outlet C may be configured to route the airflow flowing therethrough to the cockpit's canopy. In this manner, airflow 112 may be distributed to one or more of the pilot's torso, pilot's feet, and canopy by operation of system 100.

It should be noted that although the present description is focused on three outlets (e.g., A, B, and C), this is for illustrative purposes and not intended to be limiting in any way. Indeed, the present disclosure envisions any number of outlets in plurality of outlets 170, and the multi-way valve of embodiments may provide functionality for distributing an airflow even for systems including more than three outlets.

Gate assembly 150 may be configured to distribute airflow 112 to one or more of plurality of outlets 170. For example, gate assembly 150 may be configured to distribute airflow 112 to a first set of outlets (e.g., a set including any combination of outlet A, B, and/or C). In embodiments, gate assembly 150 may be configured to distribute airflow 112 to the first set of outlets by allowing airflow 112 to flow through the first set of outlets while preventing airflow 112 from flowing through a second set of outlets. For example, the first set of outlets may include outlet A alone. In this case, gate assembly 150 may be configured to distribute airflow 112 to the first set of outlets by allowing airflow 112 to flow through outlet A alone, while preventing airflow 112 from flowing through outlets B and/or C. In another example, the first set of outlets may include outlets A and B. In this case, gate assembly 150 may be configured to distribute airflow 112 to the first set of outlets by allowing airflow 112 to flow through outlets A and B, while preventing airflow 112 from flowing through outlet C. In yet another example, the first set of outlets may include outlets A and C, in which case gate assembly 150 may be configured to distribute airflow 112 to the first set of outlets by allowing airflow 112 to flow through outlets A and C, while preventing airflow 112 from flowing through outlet B. In embodiments, the first set of outlets may include any combination of outlets A, B, and/or C, such as outlet A alone, outlet B alone, outlet C alone, outlets A and B, outlets A and C, and outlets B and C. In some embodiments, the second set of outlets may include the outlets of plurality of outlets 170 that are not include in the first set of outlets. For example, where the first set of outlets includes outlet A, the second set of outlets includes outlets B and C, where the first set of outlets includes outlets A and C, the second set of outlets includes outlet B, etc.

In embodiments, gate assembly 150 may include gate opening 155, gate wall 152, and gate drive mechanism 156. Gate wall 152 may be configured to provide structural support to gate assembly 150 and/or to provide a barrier or obstacle to the flow of airflow 112. For example, gate wall 112 may be configured to overly over one or more of outlets A, B, and C and to prevent airflow 112 from passing through gate wall 152. In this manner, gate wall 112 may be configured to prevent airflow 112 from flowing through the outlets over which gate wall 152 may be positioned.

However, gate wall may be configured to include gate opening 155. In embodiments, gate opening 155 may represent an opening, hole, break, gap, etc. through which air may flow or pass through. In this manner, gate opening 155 of gate wall 152 may be configured to allow air to pass therethrough. For example, as shown in FIG. 1A, gate opening 155 may be positioned over gate B alone, while gate wall 152 covers outlets A and C. In this example, airflow 112 may be allowed to flow through outlet B, while being prevented from flowing through outlets A and C. In this example, the entirety (or a substantial portion approximating the entirety) of airflow 112 may be routed, provided, or otherwise distributed to outlet B alone, while no meaningful portion of airflow 112 is routed to outlets A and C.

As such, the cooperative functionality of gate wall 152 and gate opening 155 may allow for control of airflow 112 such that airflow 112 may be allowed to pass through some outlets while being prevented from passing through other outlets. In particular, by positioning gate opening 155 over the set of outlets to which airflow 112 is to be routed (e.g., the first set of outlets) while ensuring that gate wall 152 covers the set of outlets over which airflow 112 is not to be routed (e.g., the second set of outlets), gate assembly 150 may provide functionality to distribute airflow 112 to the first set of outlets.

In embodiments, the size of gate opening 155 may be configured to ensure that airflow 112 may flow through the corresponding one or more outlets in the first set of outlets. In some embodiments, gate opening 155 may have a size that is substantially the same (e.g., within 10%) as the size of the outlets in plurality of outlets 170. In some other embodiments, gate opening 155 may have a size that is smaller or larger than the size of the outlets in plurality of outlets 170. In some embodiments, gate opening 155 may have a substantially circular or round shape, and/or may match the shape of outlets in plurality of outlets 170.

In some embodiments, the outlets in the first set of outlets (e.g., the one or more outlets to which airflow 112 is to be routed) may be adjacent outlets, such as outlet A and B, which are adjacent to each other, or outlets B and C, which are also adjacent to each other. In these cases, positioning gate opening 155 over both adjacent outlets (e.g., positioning gate opening 155 between both adjacent outlets such that gate opening overlaps both adjacent gates) may allow distribution of airflow 112 to both adjacent gates. However, in some cases, the outlets in the first set of outlets may be non-adjacent outlets, such as outlet A and C. In this case, gate opening 155 may not be able to be positioned over both non-adjacent outlets, as gate opening 155 may not be able to overlap both non-adjacent gates. In this case, gate wall may be configured such that a proximate end of gate wall 152 may be positioned to expose at least a portion of a second outlet when gate opening 155 is positioned on the distal end of a first outlet. In some embodiments, a second gate opening (not shown) may be included in gate wall 152, where the second gate opening may be disposed on the proximate end of gate wall 152 such that, when gate opening 155 is positioned on the distal end of a first outlet, the second gate opening is positioned over at least a portion of the second outlet. In this manner, airflow 112 may be distributed to both the first and second outlet even when the first and second outlet are non-adjacent outlets.

Gate drive mechanism 156 may be coupled to gate wall 152 and to actuator 120, and may be configured to move (e.g., slide, swing, rotate, etc.), in functional cooperation with actuator 120, gate assembly 150, such as by rotating or swinging gate wall 152 along with gate opening 155, to position gate opening 155 over the first set of outlets (e.g., the one or more outlets to which airflow 112 is to be routed) thereby allowing airflow 112 to flow through gate opening 155 and through the first set of outlets, while preventing airflow 112 from flowing through the second set of outlets. In embodiments, gate drive mechanism 156 may be implemented as a gear.

Actuator 120 may be configured to provide a force for moving gate assembly 150 in order to position gate opening 155 over the first set of outlets (e.g., the one or more outlets to which airflow 112 is to be routed). For example, actuator 120 may include a motor, solenoid, driver, etc. configured to drive, swing, rotate, or otherwise move gate assembly 150. In the particular example embodiments illustrated in FIG. 1A, actuator 120 may be configured to provide a rotational force that may rotate gate assembly 150 in directions 125 and/or 126. The rotational force provided by actuator 120, in this example, may cause gate wall 152 along with gate opening 155 to rotate in direction 125 and/or 126. In this manner, gate opening 155 may be rotated to position gate opening 155 over the first set of outlets.

In some embodiments, actuator 120 may be functionally coupled directly to gate assembly 150, and may drive gate assembly 150 to position gate opening 155 over the first set of outlets. In other embodiments, actuator 120 may be functionally coupled to gate drive mechanism 156, and gate drive mechanism 156 may be functionally coupled to gate assembly 150, in which case actuator 120 may drive gate drive mechanism 156, which may case gate assembly 150 to be moved and to position gate opening 155 over the first set of outlets. In some embodiments, an idler gear (not shown) may be included to couple actuator 120 to gate drive mechanism 156.

In embodiments, user interface 190 may be configured to provide a mechanism for a user or operator to select an airflow distribution mode from a plurality of airflow distribution modes. Each airflow distribution mode of the plurality of airflow distribution modes may define, or correspond to, a different set of outlets of plurality of outlets 170. In this manner, each airflow distribution mode of the plurality of airflow distribution modes provides a different configuration of the first set of outlets described above (e.g., the set of outlets to which airflow 112 is to be routed), and indirectly may also define the second outlet (e.g., the outlets in plurality of outlets 170 no included in the first set of outlets). A selected airflow distribution mode may define the first set of outlets to which airflow 112 is to be routed. For example, in the example illustrated in FIG. 1A, outlet A may be configured to route the airflow flowing therethrough to the pilot's torso, outlet B may be configured to route the airflow flowing therethrough to the pilot's feet, and outlet C may be configured to route the airflow flowing therethrough to the cockpit's canopy. In this example, user interface 190 may include the plurality of airflow distribution modes including a first airflow distribution mode for providing the airflow to the pilot's torso entirely, in which case, the first airflow distribution mode may define a configuration of the first set of outlets to include outlet A alone, and a configuration of the second set of outlets to include outlets B and C. Further in this example, the plurality of airflow distribution modes may include a second airflow distribution mode for splitting the airflow between the pilot's torso and the pilot's feet, in which case, the second airflow distribution mode may define a configuration of the first set of outlets to include outlets A and B, and a configuration of the second set of outlets to include outlet C alone. The plurality of airflow distribution modes may also include a third airflow distribution mode for providing the airflow to the pilot's feet entirely, in which case, the third airflow distribution mode may define a configuration of the first set of outlets to include outlet B entirely, and a configuration of the second set of outlets to include outlets A and C. The plurality of airflow distribution modes may also include a fourth airflow distribution mode for splitting the airflow between the pilot's feet and the canopy, in which case, the fourth airflow distribution mode may define a configuration of the first set of outlets to include outlets B and C, and a configuration of the second set of outlets to include outlet A alone. The plurality of airflow distribution modes may also include a fifth airflow distribution mode for providing the airflow to the canopy entirely, in which case, the fifth airflow distribution mode may define a configuration of the first set of outlets to include outlet C entirely, and a configuration of the second set of outlets to include outlets A and B. The plurality of airflow distribution modes may also include a sixth airflow distribution mode for splitting the airflow between the canopy and the pilot's torso, in which case, the sixth airflow distribution mode may define a configuration of the first set of outlets to include outlets C and A, and a configuration of the second set of outlets to include outlet B alone.

In embodiments, where a selected airflow distribution mode is configured to provide airflow to more than one locations (e.g., defining configuration of the first set of outlets to include more than one outlet), the configuration of system 100 may include configuration to split the airflow 112 in different proportions. For example, the selected airflow distribution mode may be configured to provide airflow 112 to more a first and second locations, which may define a configuration of the first set of outlets to include a first outlet and a second outlet. In this example, in some embodiments, system 100 may be configured to split airflow 112 evenly between both the first and second outlets. In this case, approximately 50% of airflow 112 may be routed to the first outlet and approximately 50% of airflow 112 may be routed to the second outlet. In some embodiments, the split proportion may not be even. For example, in some embodiments, system 100 may be configured to split airflow 112 such that a first percentage of airflow 112 may be routed to the first outlet and a second percentage of airflow 112 may be routed to the second outlet, where the first and second percentages may not be the same. As an example, approximately 70% of airflow 112 may be routed to the first outlet and approximately 30% of airflow 112 may be routed to the second outlet. In any case, the percentage of airflow 112 routed to the outlet or outlets corresponding to the selected airflow distribution mode, whether split or not, may be approximately 100%.

Figure 1B:
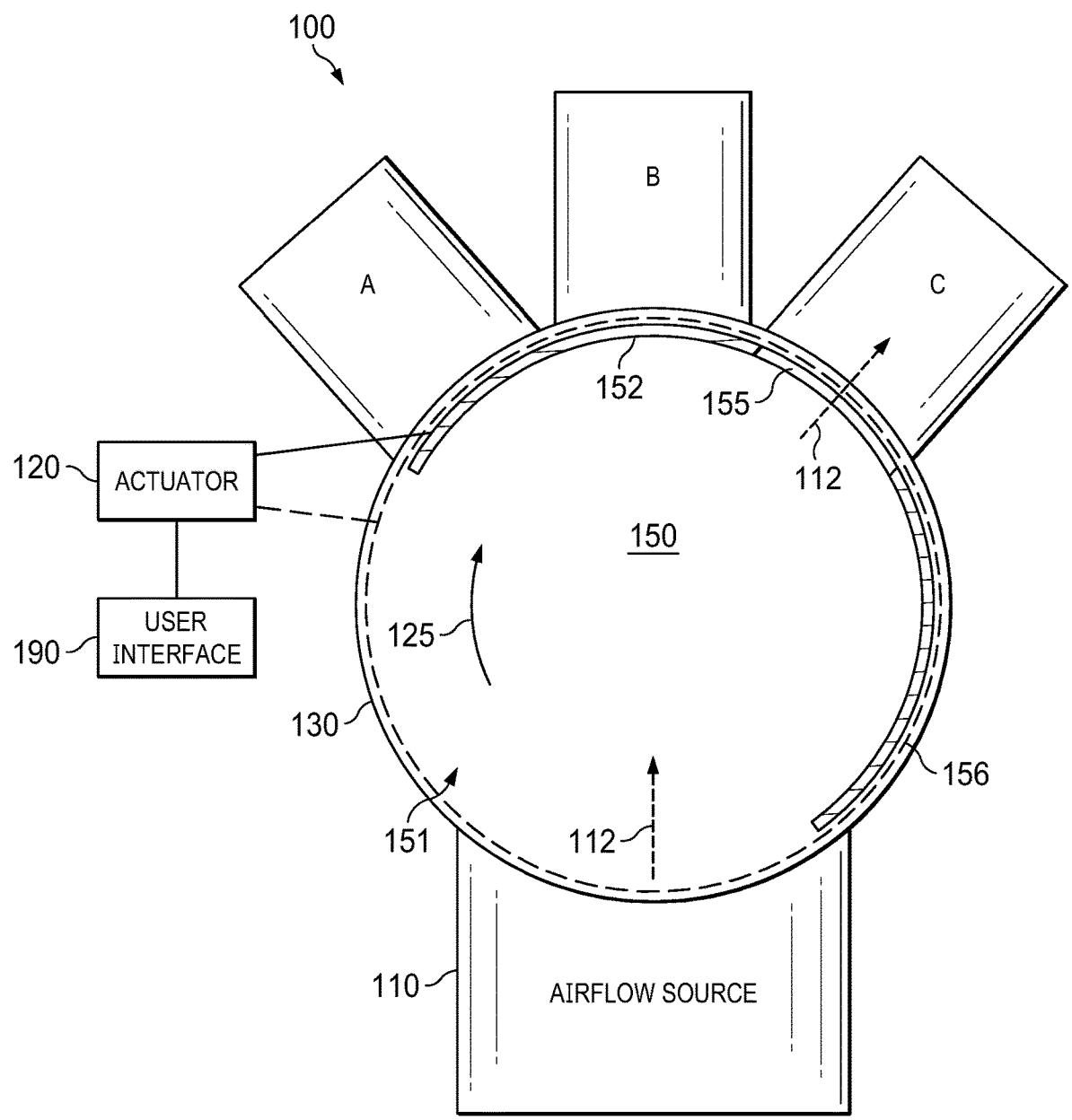
FIG. 1B shows another example configuration of the system configured with capabilities and functionality in accordance with embodiments of the present disclosure.

In embodiments, a user may select an airflow distribution mode using user interface 190 and system 100 may activate actuator 120 to position gate opening 155 over the corresponding outlet or outlets (e.g., over the first set of outlets) to allow air to be distributed based on the selected airflow distribution mode. For example, FIG. 1B shows another example configuration of system 100 configured with capabilities and functionality in accordance with embodiments of the present disclosure. In the example illustrated in FIG. 1B, the user or operator (e.g., the pilot) may select the fifth airflow distribution mode (e.g., to route the airflow to the canopy entirely), which may define a configuration of the first set of outlets to include outlet C entirely, and a configuration of the second set of outlets to include outlets A and B. In this case, actuator 120 may be activated to rotate (e.g., using gate drive mechanism 156) gate assembly 150 in direction 125 to position gate opening 155 over outlet C. In this example, gate wall 152 may cover both gates A and C in their entirety. In this position, airflow 112 may be allowed to flow through gate opening 155 into and through outlet C, while being prevented (e.g., by gate wall 152) from flowing into outlets A and B. In this configuration, therefore, the airflow 112 provided by airflow source 110 may be routed entirely to the canopy (e.g., via outlet C), while no airflow is provided to the pilot's torso or the pilot's feet.

Figure 1C:
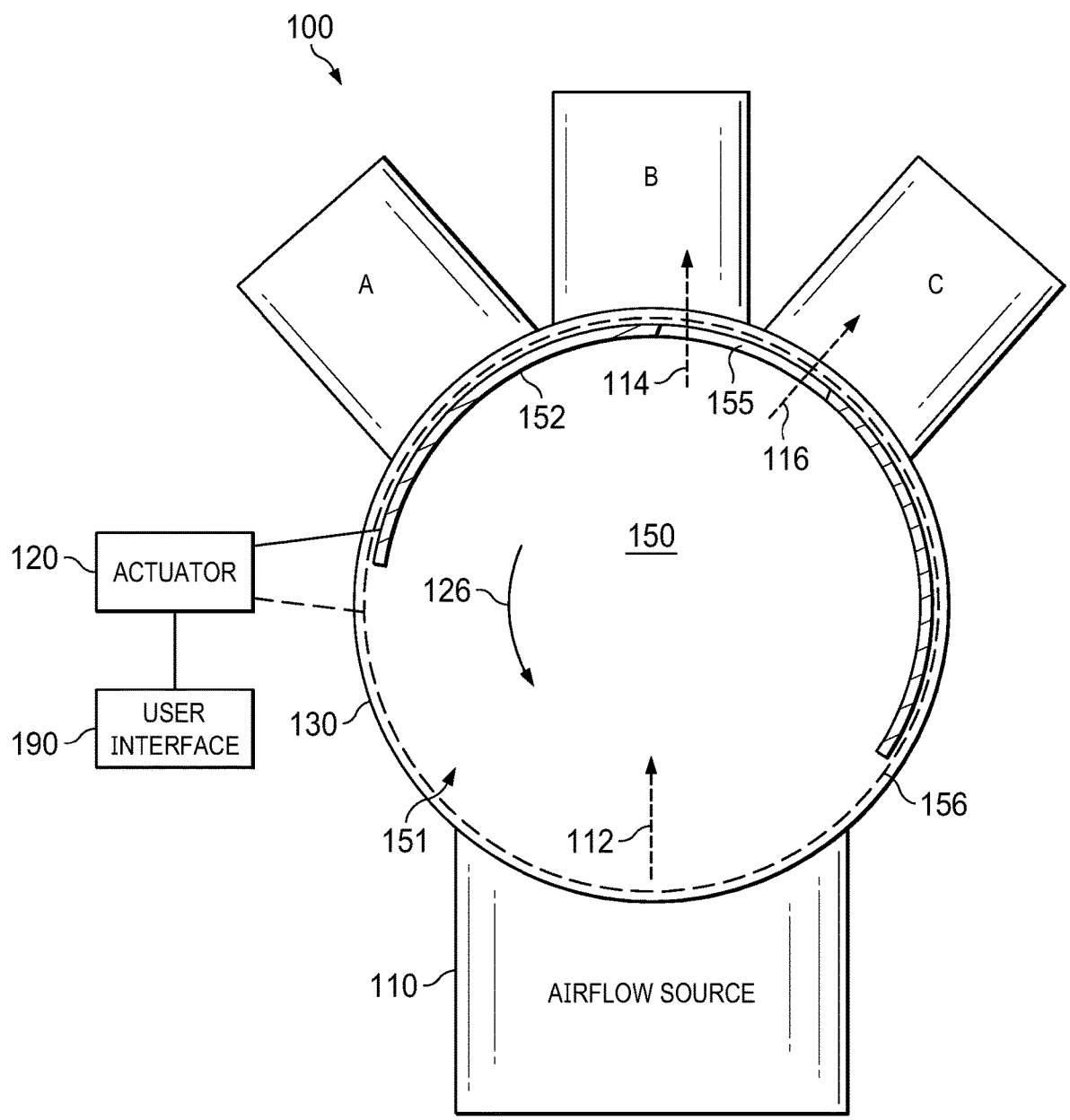
FIG. 1C shows yet another example configuration of the system configured with capabilities and functionality in accordance with embodiments of the present disclosure.

Following the example above, the user may select another airflow distribution mode. For example, FIG. 1C shows yet another example configuration of system 100 configured with capabilities and functionality in accordance with embodiments of the present disclosure. In the example illustrated in FIG. 1C, the user or operator (e.g., the pilot) may select the fourth airflow distribution mode (e.g., to split the airflow between the pilot's feet and the canopy), which may define a configuration of the first set of outlets to include outlets B and C, and a configuration of the second set of outlets to include outlet A alone. In this case, actuator 120 may be activated to rotate (e.g., using gate drive mechanism 156) gate assembly 150 in direction 126 to position gate opening 155 over both outlets B and C. In this case, gate opening may overlap both outlets B and C, and may cover at least a portion of each of outlets B and C. In this example, gate wall 152 may cover gate A in its entirety. In this position, airflow 112 may be allowed to flow through gate opening 155 into and through outlets B and C (e.g., a first portion of airflow 112 may flow into and through outlet B and a second portion of airflow 112 may flow into and through outlet C, the first and second portion making up the entirety (or approximate entirety, such as within 10%) of airflow 112), while being prevented (e.g., by gate wall 152) from flowing into outlet A. In this configuration, therefore, the airflow 112 provided by airflow source 110 may be split between the pilot's feet (e.g., via outlet B) and the canopy (e.g., via outlet C), while no airflow is provided to the pilot's torso.

Figure 1D:
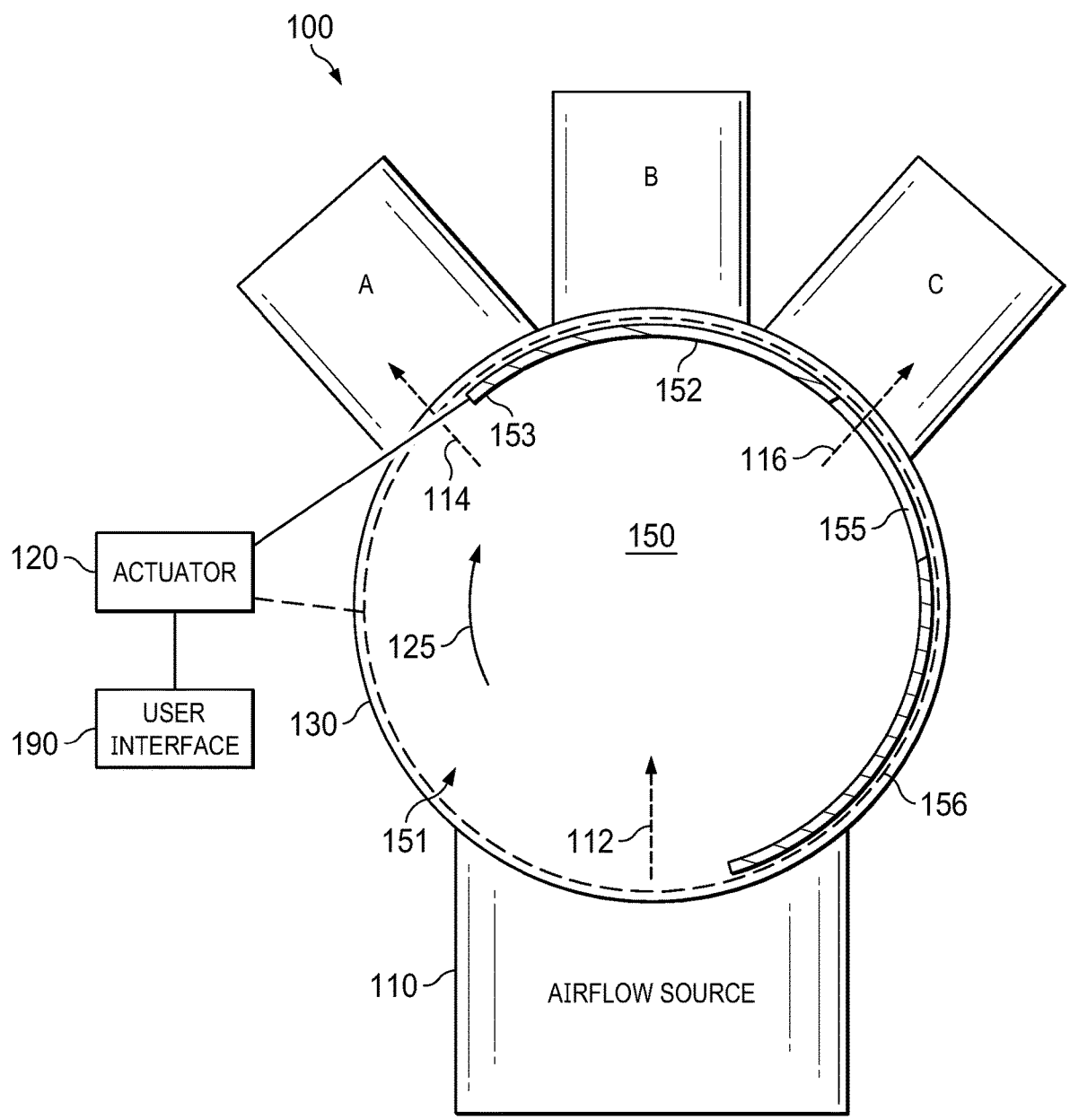
FIG. 1D shows yet another example configuration of the system configured with capabilities and functionality in accordance with embodiments of the present disclosure

Still following the example above, the user may select yet another airflow distribution mode. For example, FIG. 1D shows yet another example configuration of system 100 configured with capabilities and functionality in accordance with embodiments of the present disclosure. In the example illustrated in FIG. 1D, the user or operator (e.g., the pilot) may select the sixth airflow distribution mode (e.g., to split the airflow between the pilot's torso and the canopy), which may define a configuration of the first set of outlets to include outlets A and C, and a configuration of the second set of outlets to include outlet B alone. In this case, however, the outlets in the first set of outlets (e.g., outlets A and C) are non-adjacent outlets. As described herein, gate opening 155 may not be able to be positioned to overlap both outlets A and C. In this configuration, however, proximate end 153 of gate wall 152 may be configured to allow airflow 112 to flow through at least a portion of outlet A when gate opening is positioned to partially over the distal end 195 of outlet C. For example, as shown in FIG. 1D, gate wall 152 may be configured with a length that, when gate assembly 150 is rotated to position gate opening 155 partially over outlet C such that only distal end of outlet C is exposed and the proximate end of outlet C is covered (e.g., when gate opening allows air to flow through the far end of outlet C but does not allow air to flow through the closer end of outlet C), the length of gate wall 152, which may be shortened, causes gate wall 152 to move past the proximate edge of outlet A to expose a portion of outlet A. In this case, actuator 120 may be activated to rotate (e.g., using gate drive mechanism 156) gate assembly 150 in direction 125 to position gate opening 155 partially over outlet C and to expose a portion of outlet A by rotating proximate end 153 of gate wall 152 to uncover the exposed portion. In this position, a portion of both outlets A and C may be uncovered or exposed to allow air through, while outlet B is covered. In this position, airflow 112 may be allowed to flow through gate opening 155 into and through a portion of outlet C and through a portion of outlet A, which is not covered by gate wall 152 (e.g., a first portion of airflow 112 may flow into and through outlet A and a second portion of airflow 112 may flow into and through outlet C, the first and second portion making up the entirety (or approximate entirety, such as within 10%) of airflow 112), while being prevented (e.g., by gate wall 152) from flowing into outlet B. In this configuration, therefore, the airflow 112 provided by airflow source 110 may be split between the pilot's torso (e.g., via outlet A) and the canopy (e.g., via outlet C), while no airflow is provided to the pilot's feet.

In some embodiments, rather than moving gate wall 152 (e.g., proximate end 153) past the edge of outlet A to uncover a portion of outlet A, gate wall 152 may include a second gate opening (not shown) disposed near proximate end 153. The second gate opening may allow air to pass through, and may allow a portion of airflow 112 to flow into and through outlet A when positioned over outlet A. The second gate opening may be the same size or smaller than gate opening 155. In this manner, airflow 112 may be allowed to flow through gate opening 155 into and through a portion of outlet C and through the second gate opening into and through a portion of outlet A, while being prevented (e.g., by gate wall 152) from flowing into outlet B.

Figure 2B:
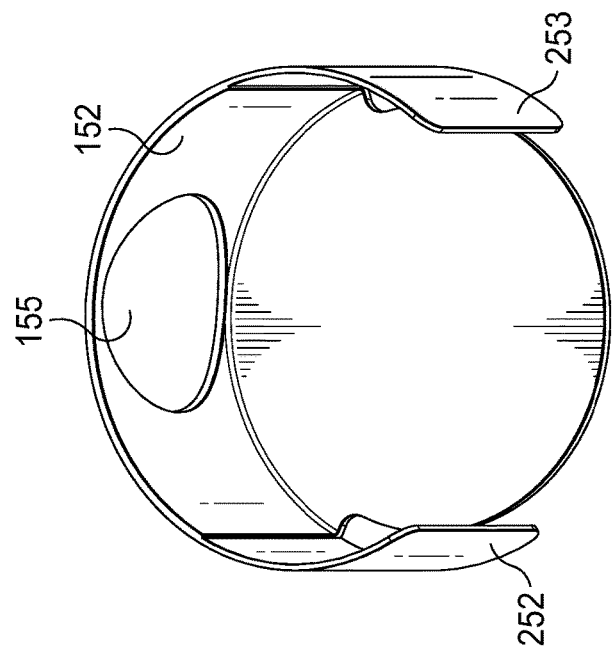
FIG. 2B shows a view of a gate assembly in accordance with embodiments of the present disclosure.
Figure 2A:
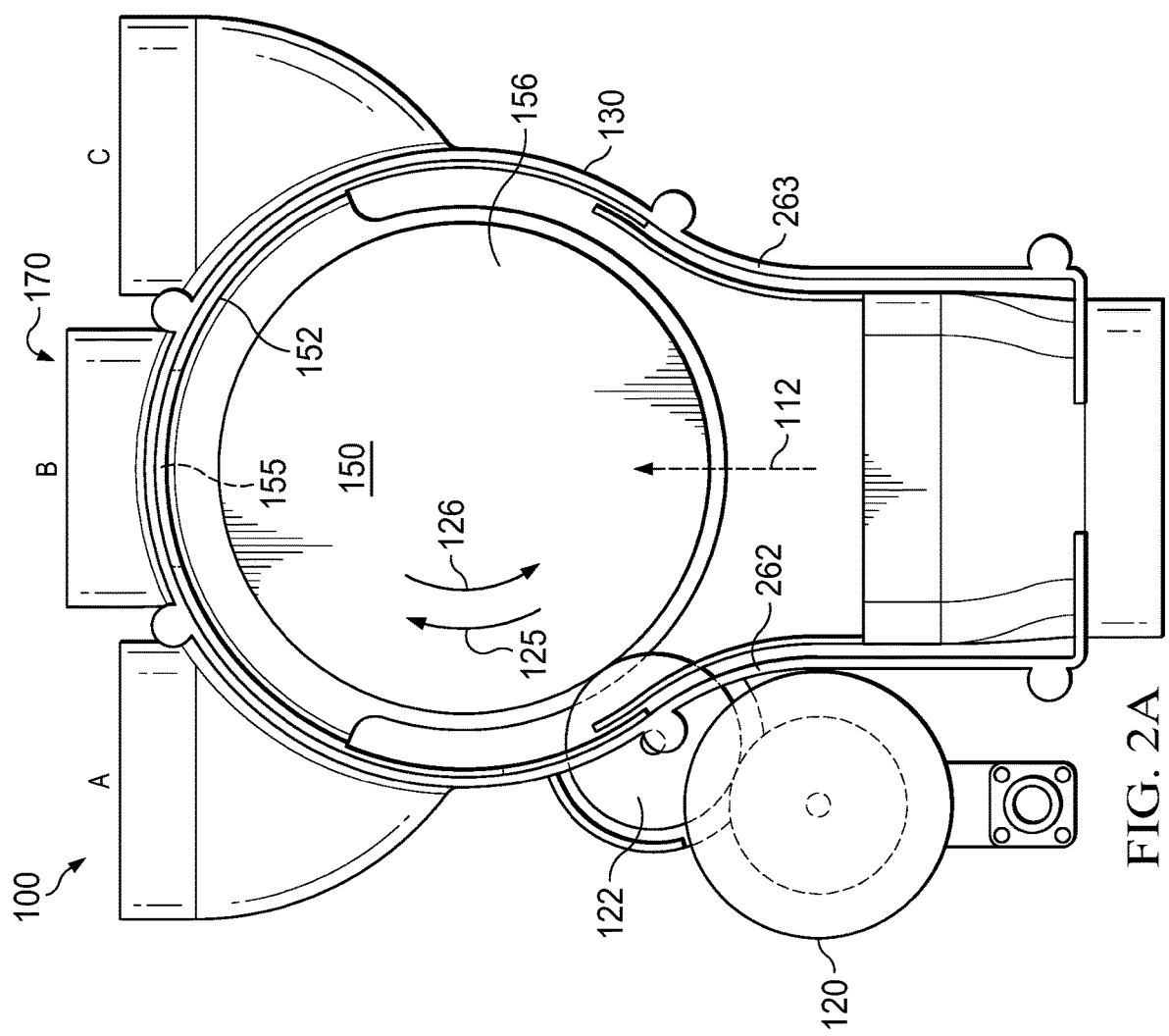
FIG. 2A shows an example implementation of a system configured with capabilities and functionality in accordance with embodiments of the present disclosure.
Figure 2C:
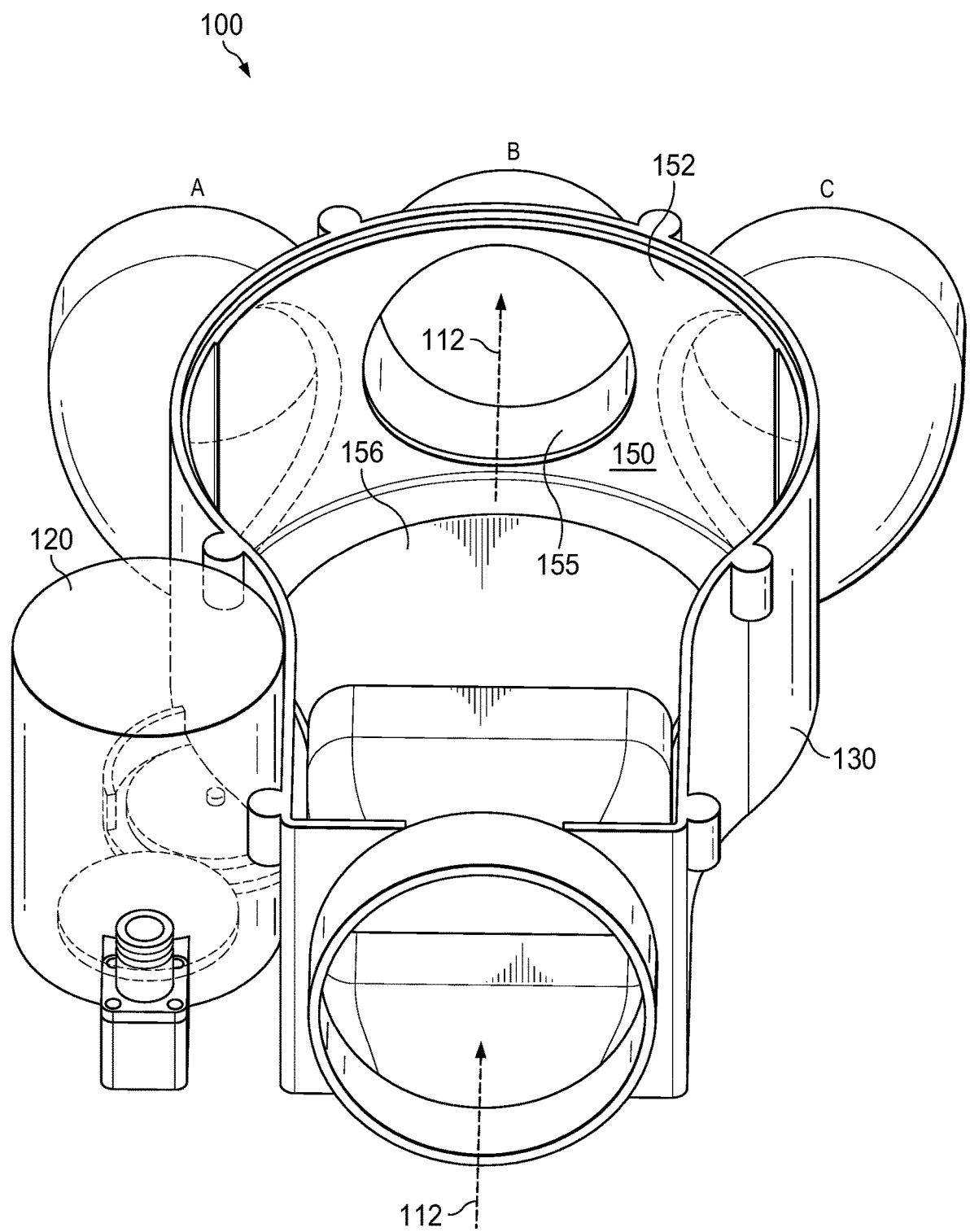
FIG. 2C shows a perspective view of the example implementation of the system configured with capabilities and functionality in accordance with embodiments of the present disclosure.

As mentioned above, implementation of system 100 may include several configurations. FIG. 2A shows an example implementation of system 100 configured with capabilities and functionality in accordance with embodiments of the present disclosure. FIG. 2B shows a view of gate assembly 150 in accordance with embodiments of the present disclosure. FIG. 2C shows a perspective view of the example implementation of system 100 configured with capabilities and functionality in accordance with embodiments of the present disclosure. As shown in FIG. 2A, this implementation of system 100 may include gate assembly 150, actuator 120, idler gear 122, housing 130, and plurality of outlets 170. The functionality of system 100 as illustrated in FIGS. 2A and 2B is similar to the functionality of the example illustrated in FIGS. 1A-1D. In this implementation, an idler gear 122 may be used to couple actuator 120 to gate drive mechanism 156.

In the example shown in FIGS. 2A and 2B, gate assembly 150 may be provided in a round configuration. For example, gate wall 152 may be provided in a round shape configured to curve around housing 130. In this example, as gate drive mechanism 156 is rotated by actuator 120, gate wall 152 rotates and slides in the direction of the rotation along the interior wall of housing 130, as gate opening 155 is moved along and positioned traversing over outlets A-C. In embodiments, gate wall 152 may include flexible tail ends, such as proximate tail end 252 and distal tail end 253 configured to slide into proximate tail slide 262 and distal tail slide 263, respectively. The cooperative operation of the flexible tail ends and the tail slides may provide structural support, guidance for the rotation of gate assembly 150, as the actuator 120 is off centered with respect to gate assembly 150.

During operation, as shown in FIG. 2B, airflow 112 may flow into main chamber 151 of housing 130, and may be routed to one or more of outlets A, B, and C, according to the functionality described herein. In the particular configuration of the example illustrated in FIG. 2B, gate opening 155 may be positioned over outlet B entirely, in which case airflow 112 may be allowed to flow through gate opening 155 into and out of outlet B, while being prevented from flowing into outlets A and C by gate wall 152. As described above, actuator 120 may be used to rotate gate assembly 150 to position gate opening over one or more outlets based on a selected airflow distribution mode.

Figure 3A:
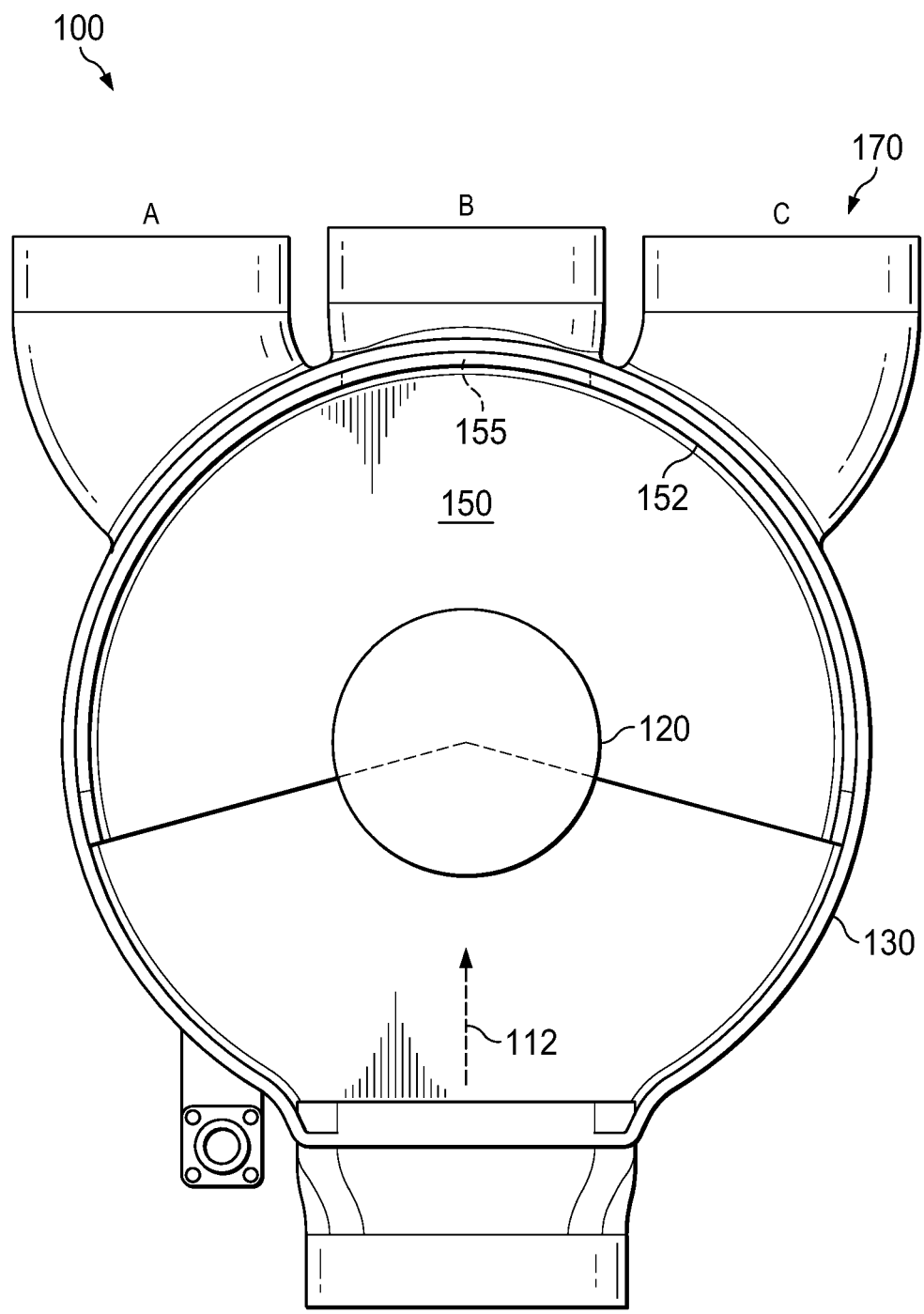
FIGS. 3A and 3C show another example implementation of a system configured with capabilities and functionality in accordance with embodiments of the present disclosure.
Figure 3B:
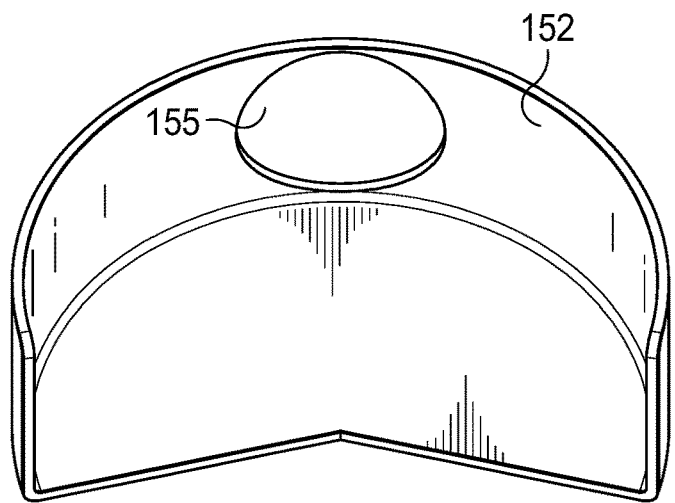
FIG. 3B shows a view of a gate assembly in accordance with embodiments of the present disclosure.
Figure 3C:
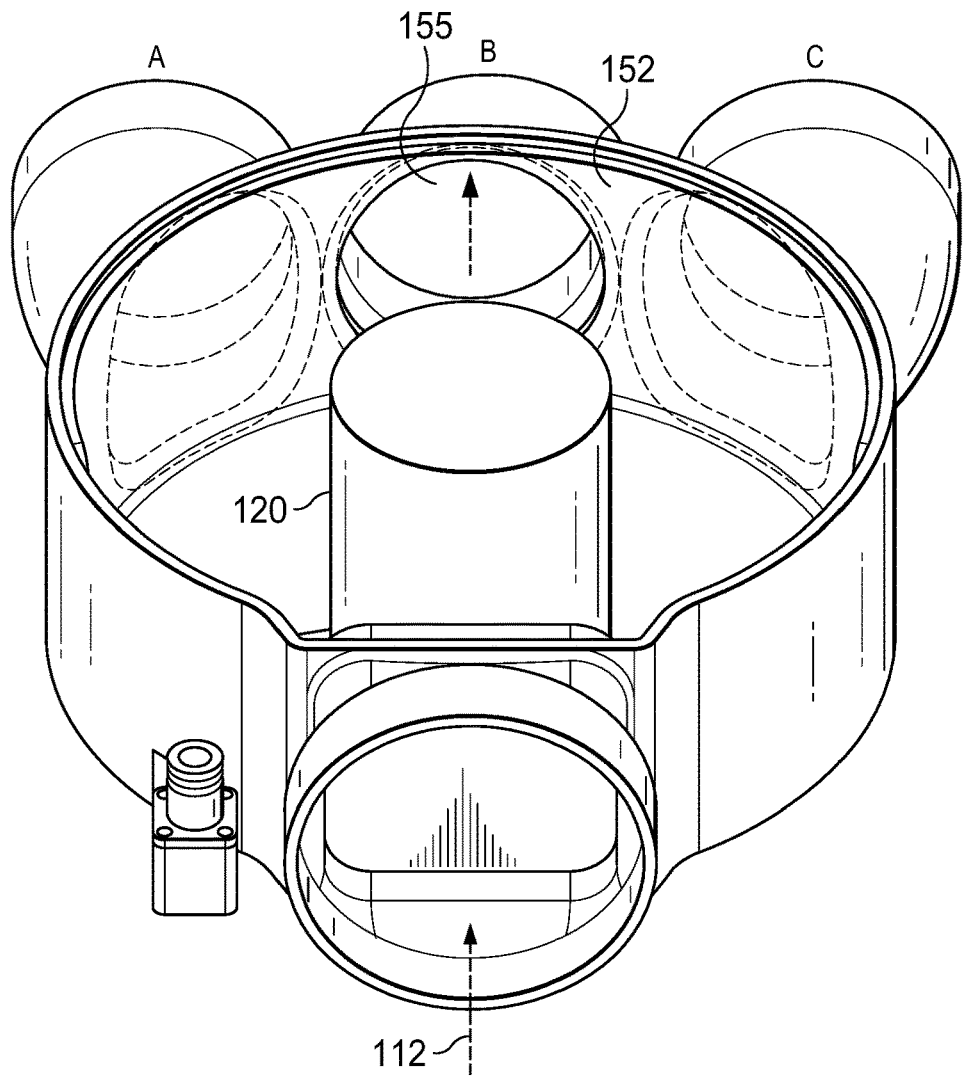

FIGS. 3A and 3C show another example implementation of system 100 configured with capabilities and functionality in accordance with embodiments of the present disclosure. As shown in FIGS. 3A and 3C, this implementation of system 100 may include gate assembly 150, actuator 120, housing 130, and plurality of outlets 170. FIG. 3B shows a view of gate assembly 150 in accordance with embodiments of the present disclosure. The functionality of system 100 as illustrated in FIG. 3A (and FIGS. 3C-3G) is similar to the functionality of the example illustrated in FIGS. 1A-1D. In this implementation, gate assembly 150 may be provided in a round configuration with a cutout, which gives a shape of circle with a sector removed, as seen in FIG. 3B. In embodiments, the cutout shape of gate assembly 150 may allow gate wall 152 to be rotated past the edge of an end outlet (e.g., outlet A or outlet C) which may permit gate assembly to route airflow 112 through two non-adjacent outlets.

In the example shown in FIGS. 3A and 3C, actuator 120 may be mounted on the center of gate assembly 150, which may provide better stability when rotating gate assembly 150. In this example, an idler gear may not be used.

Figure 3D:
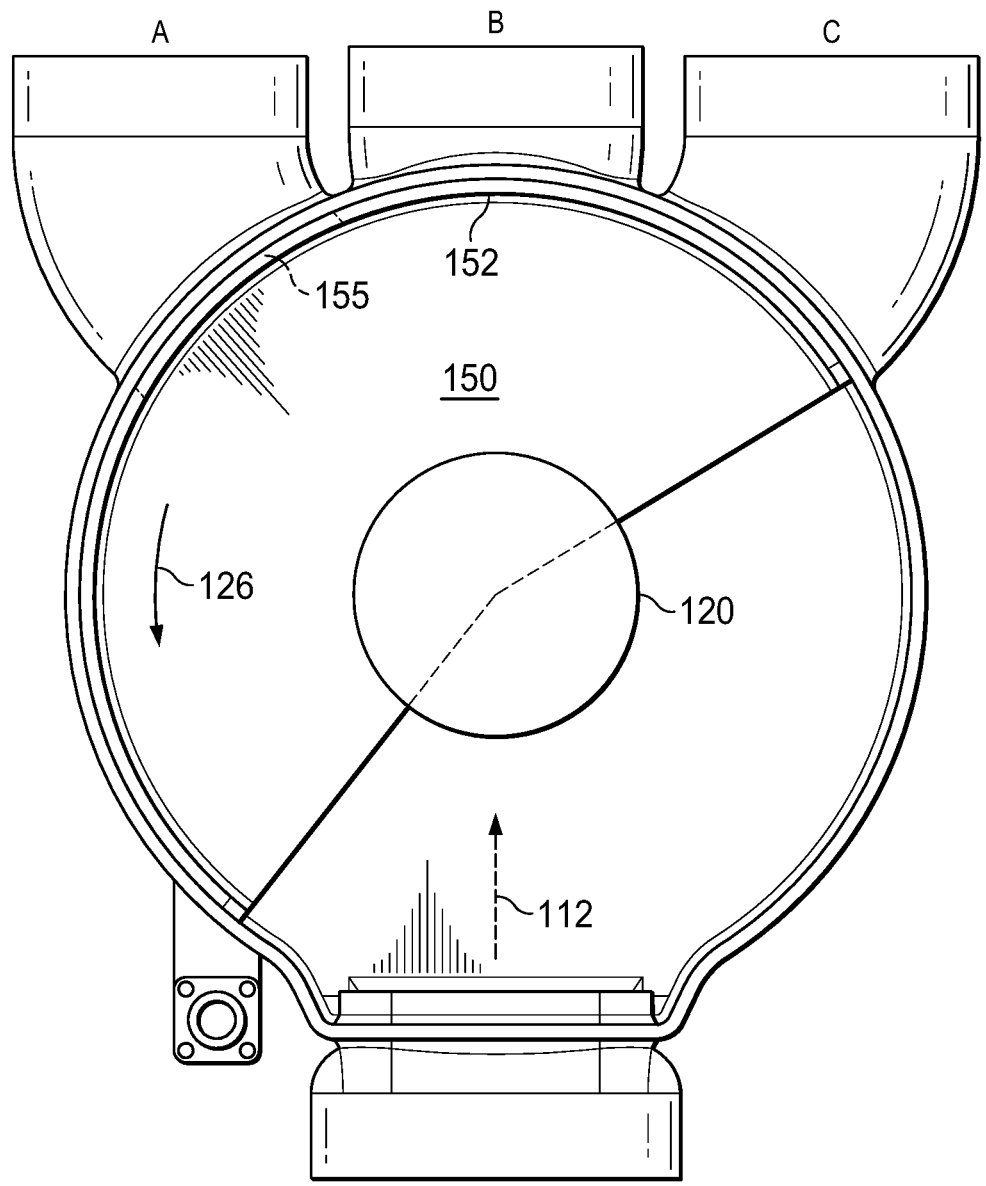
FIGS. 3D-3G show diagrams illustrating operations of the example implementation of the system configured with capabilities and functionality in accordance with embodiments of the present disclosure
Figure 3E:
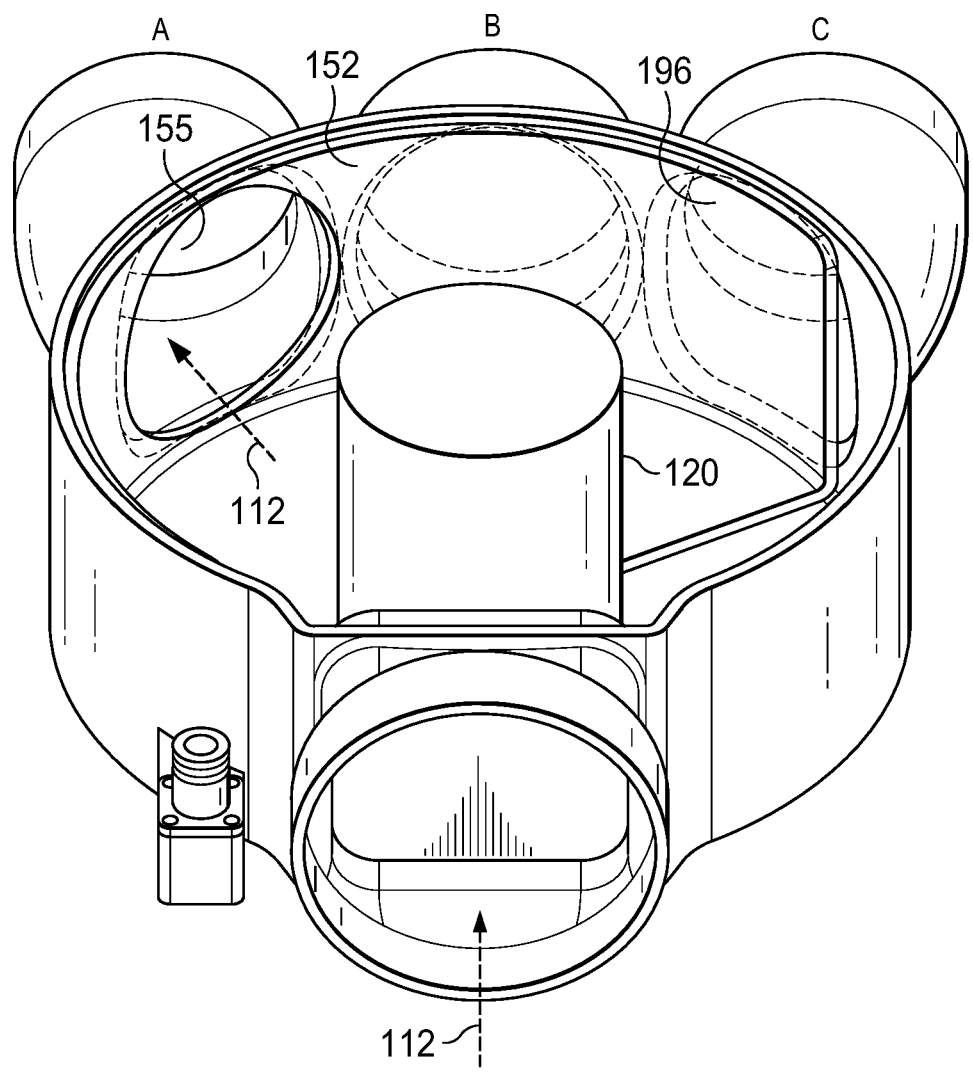
Figure 3F:
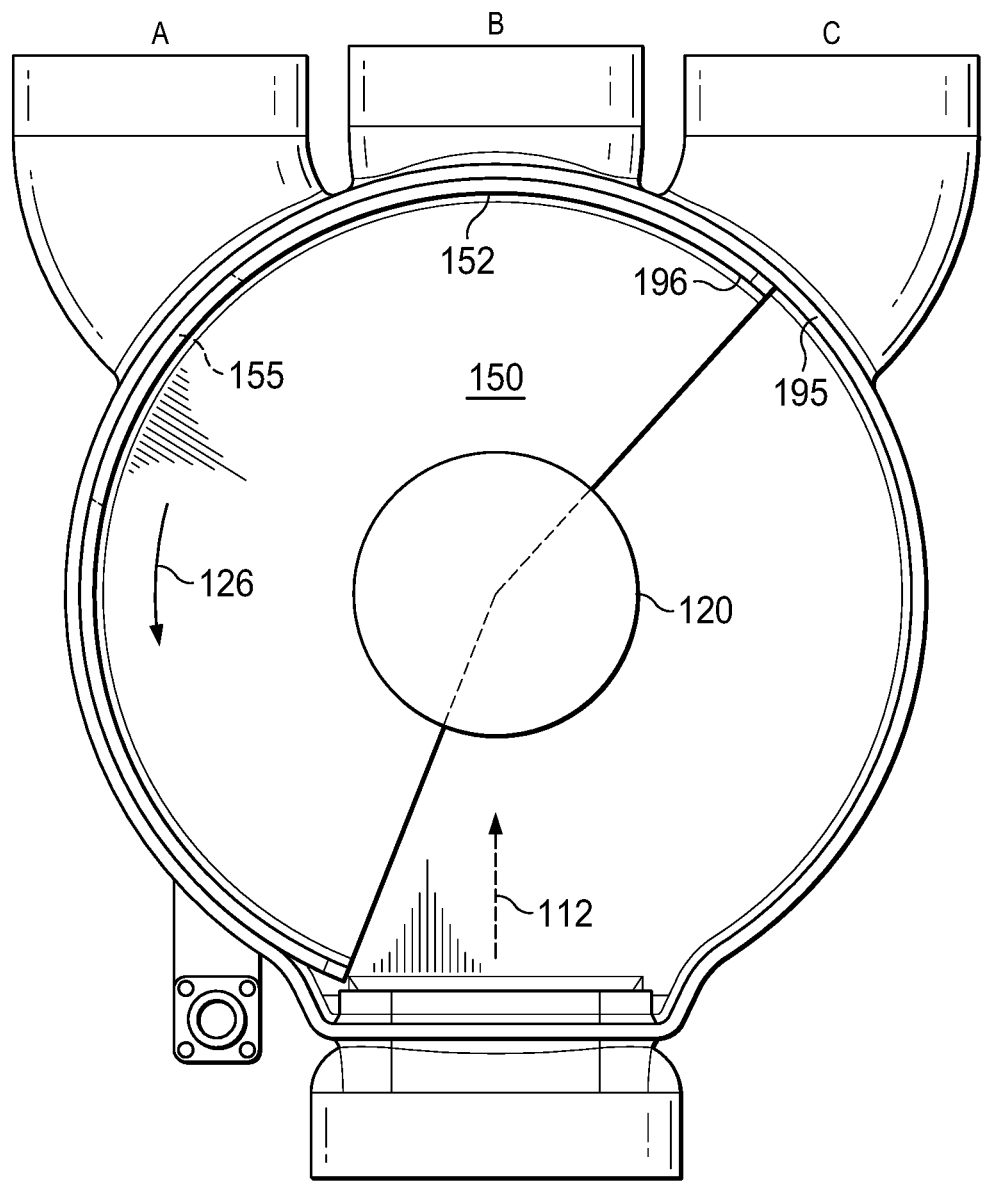
Figure 3G:
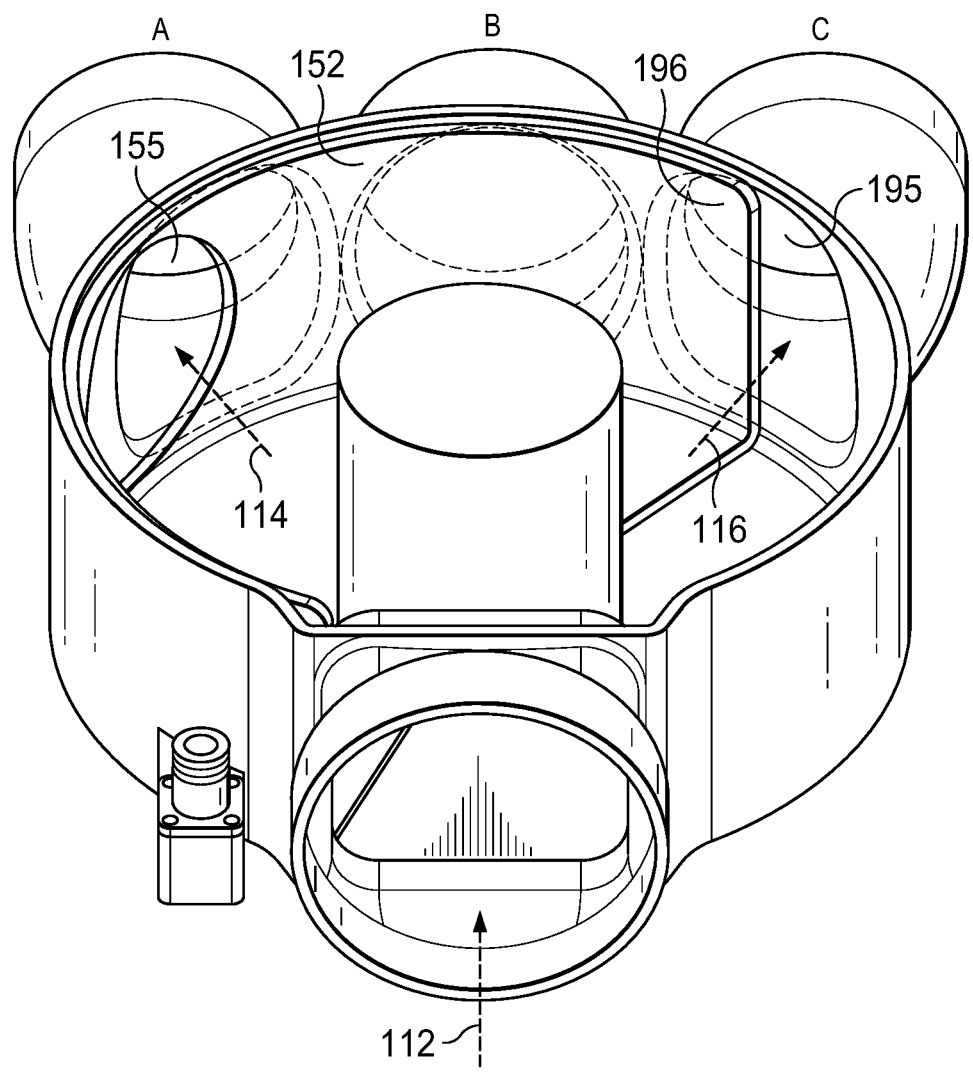

During operation, as shown in FIGS. 3D-3G, airflow 112 may flow into housing 130, and may be routed to one or more of outlets A, B, and C, according to the functionality described herein. In particular, as shown in FIGS. 3D and 3E, gate assembly 150 may be rotated (e.g., in direction 126) to position opening 155 over outlet A entirely, in which case airflow 112 may be allowed to flow through gate opening 155 into and out of outlet A, while being prevented from flowing into outlets B and C by gate wall 152. FIGS. 3F and 3G show a configuration in which gate assembly 150 may be rotated (e.g., in direction 126) to position opening 155 over only a portion of outlet A, while distal end 196 of gate wall 152 is moved past the distal edge of outlet C, exposing (e.g., uncovering) distal end 195 of outlet C. In this position, portion 114 of airflow 112 may be allowed to flow through gate opening 155 into and out of the portion of outlet A over which gate opening 155 is positioned, and portion 116 of airflow 112 may be allowed to flow into and out of distal end 195 of outlet C, while being prevented from flowing into outlet B by gate wall 152.

Figure 4A:
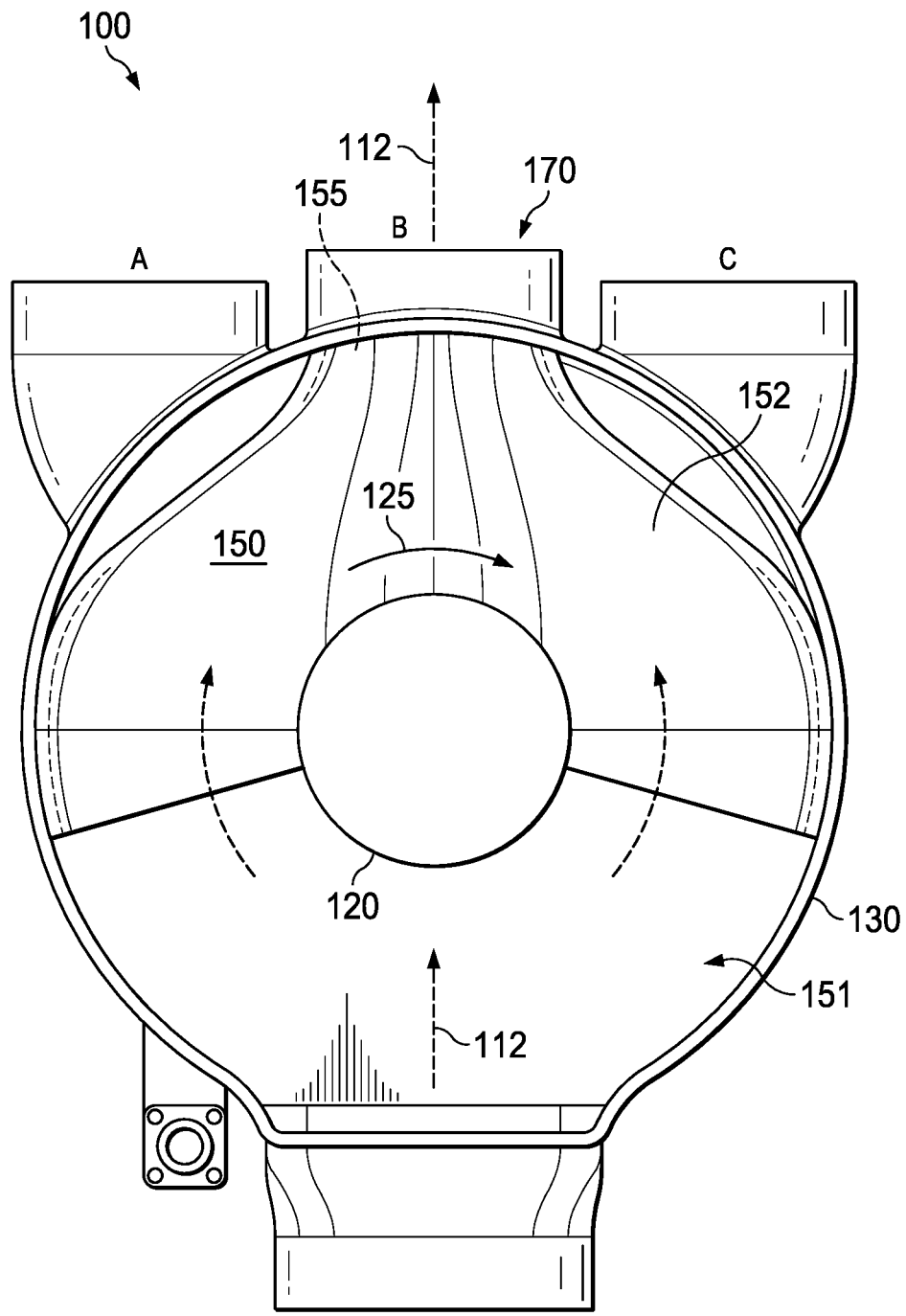
FIG. 4A shows yet another example implementation of a system configured with capabilities and functionality in accordance with embodiments of the present disclosure.
Figure 4B:
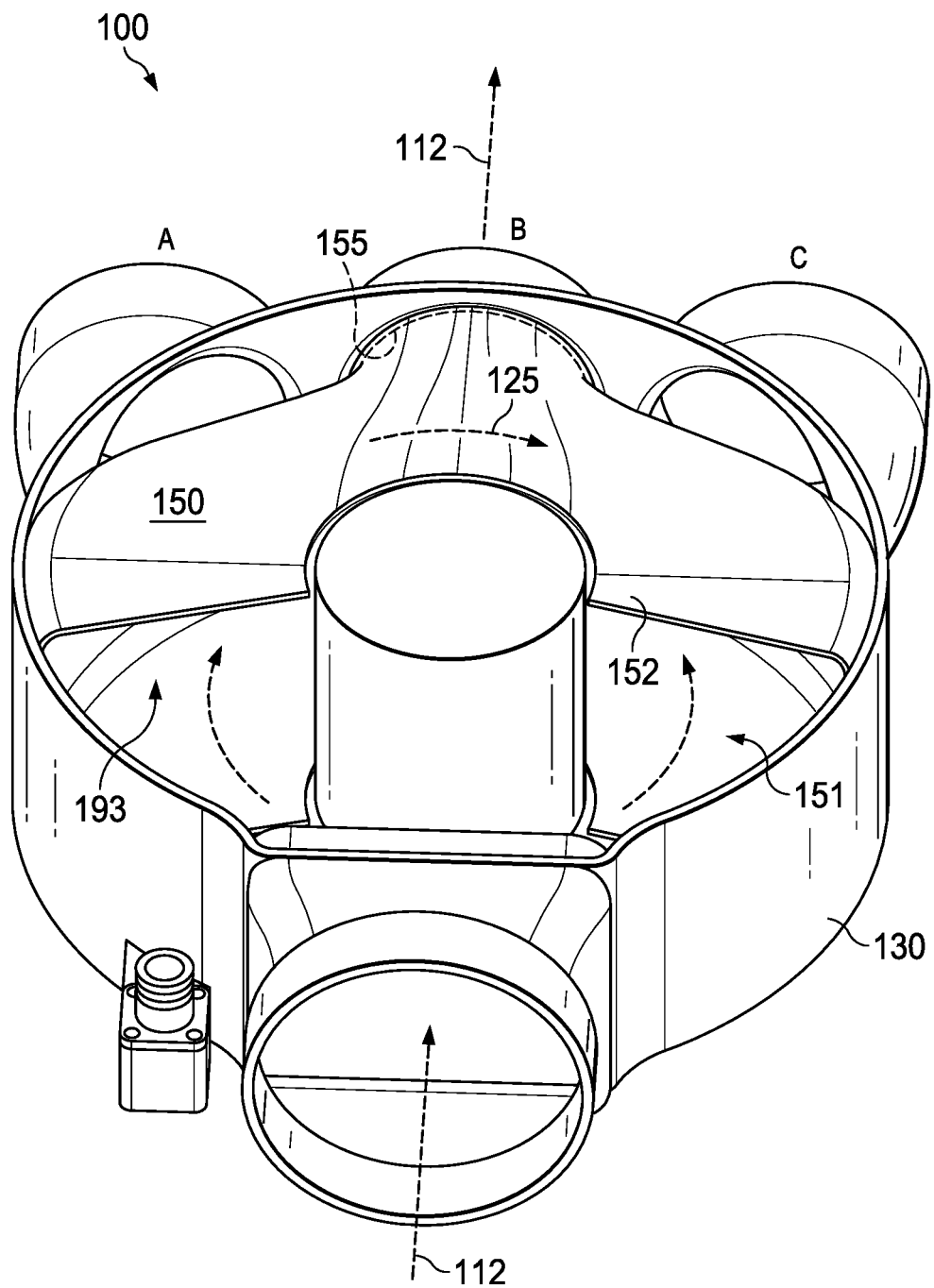
FIG. 4B shows a perspective view of the example implementation of the system configured with capabilities and functionality in accordance with embodiments of the present disclosure.

FIG. 4A shows yet another example implementation of system 100 configured with capabilities and functionality in accordance with embodiments of the present disclosure. FIG. 4B shows a perspective view of the example implementation of system 100 configured with capabilities and functionality in accordance with embodiments of the present disclosure. As shown in FIG. 4A, this implementation of system 100 may include gate assembly 150, actuator 120, housing 130, and plurality of outlets 170. The functionality of system 100 as illustrated in FIGS. 4A and 4B is similar to the functionality of the example illustrated in FIGS. 1A-1D.

In this implementation, gate assembly 150 may be provided in a cone shape configuration. The cone shape configuration of gate assembly 150 may provide a further reduction in backpressure within system 100. The cone shape configuration of gate assembly 150 may include a chamber 193 that converges into gate opening 155, as illustrated in FIGS. 4A and 4B. In this implementation, actuator 120 may be mounted on the center of gate assembly 150.

During operation, as shown in FIG. 4B, airflow 112 may flow into main chamber 151 of housing 130, and may be routed through chamber 193 of gate assembly 150 and through gate opening 155 to one or more of outlets A, B, and C, according to the functionality described herein. In the particular configuration of the example illustrated in FIG. 4B, gate opening 155 may be positioned over outlet B entirely, in which case airflow 112 may be allowed to flow through gate opening 155 into and out of outlet B, while being prevented from flowing into outlets A and C by gate wall 152. As described above, actuator 120 may be used to rotate gate assembly 150 to position gate opening over one or more outlets based on a selected airflow distribution mode.

Figure 5A:
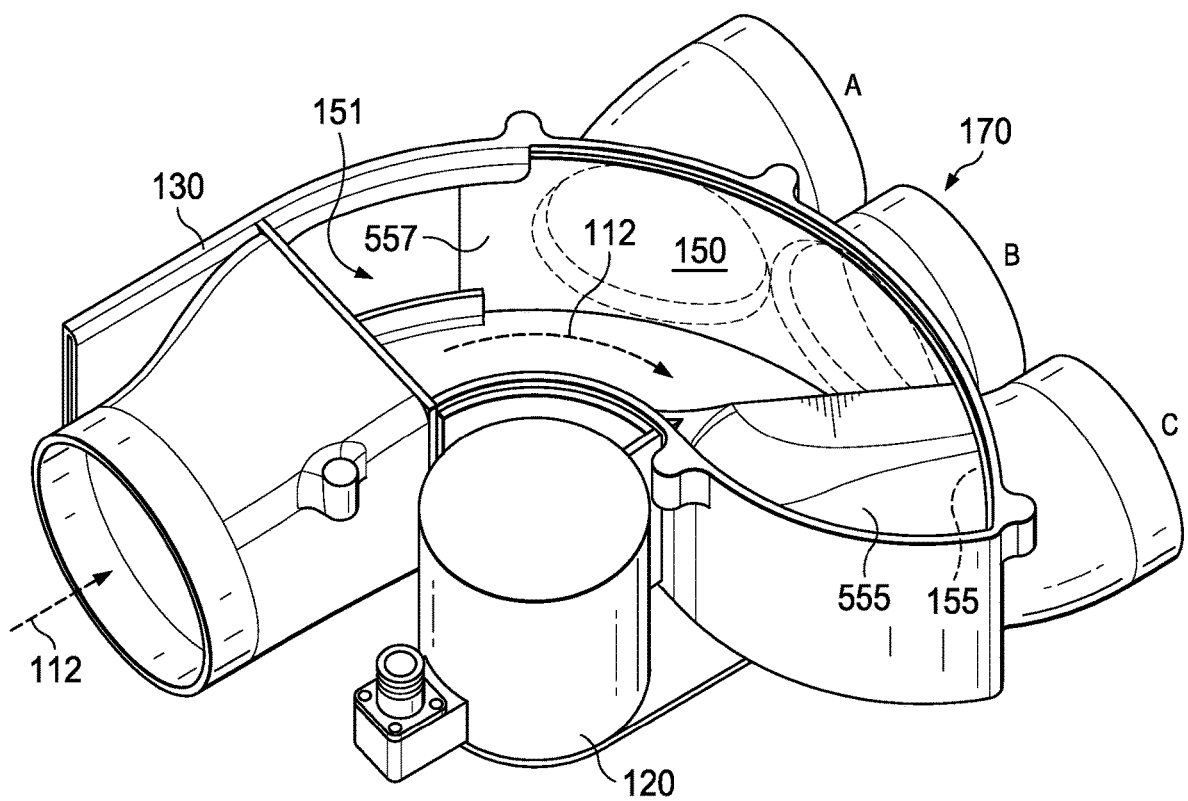
FIG. 5A shows still another example implementation of a system configured with capabilities and functionality in accordance with embodiments of the present disclosure.
Figure 5B:
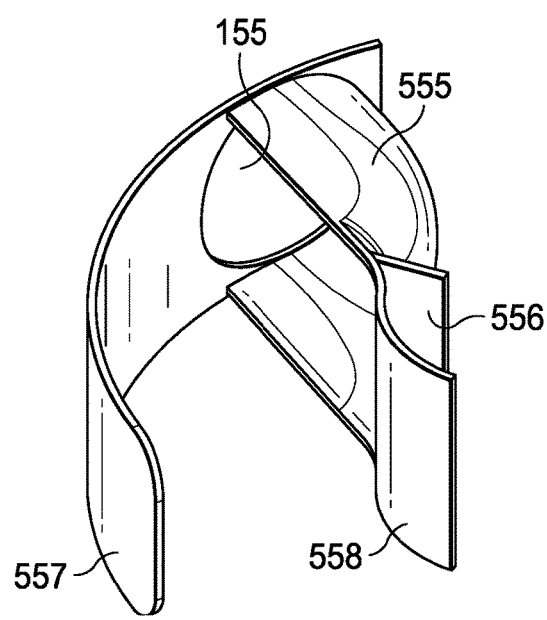
FIG. 5B shows a view of a scoop-shaped gate assembly configured with capabilities and functionality in accordance with embodiments of the present disclosure.
Figure 5E:
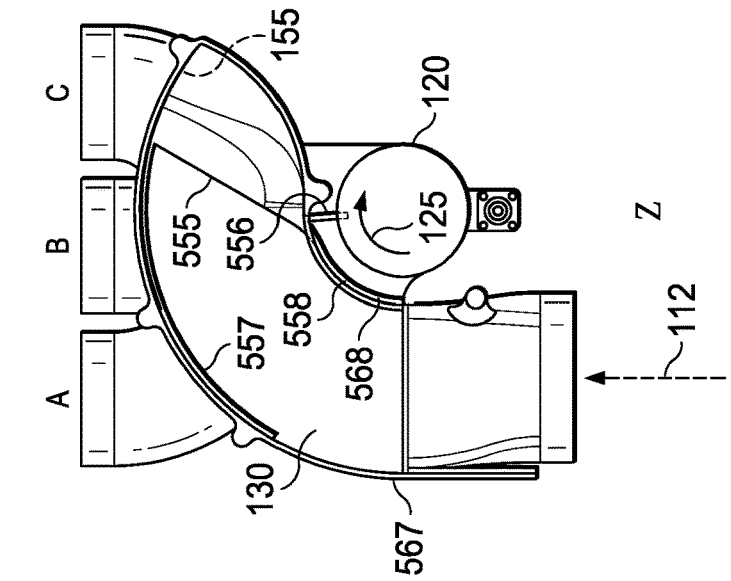
FIGS. 5C-5E show diagrams illustrating operations of an example implementation of a system configured with capabilities and functionality in accordance with embodiments of the present disclosure.
Figure 5D:
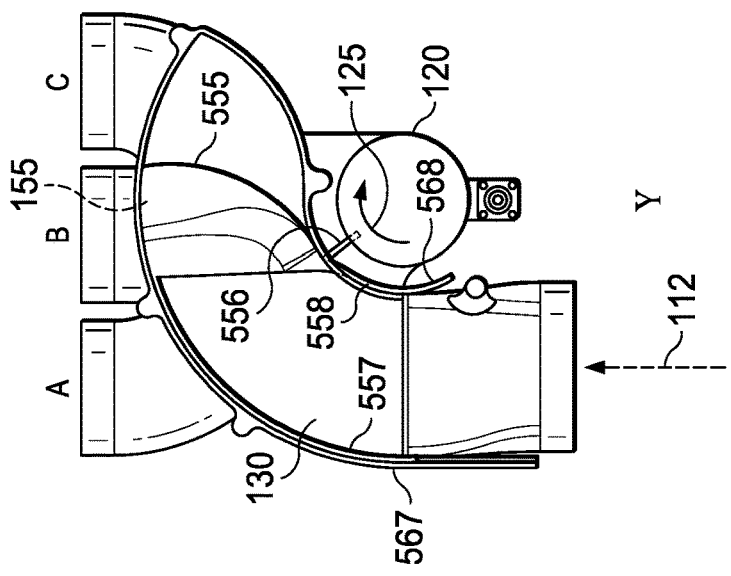
Figure 5C:
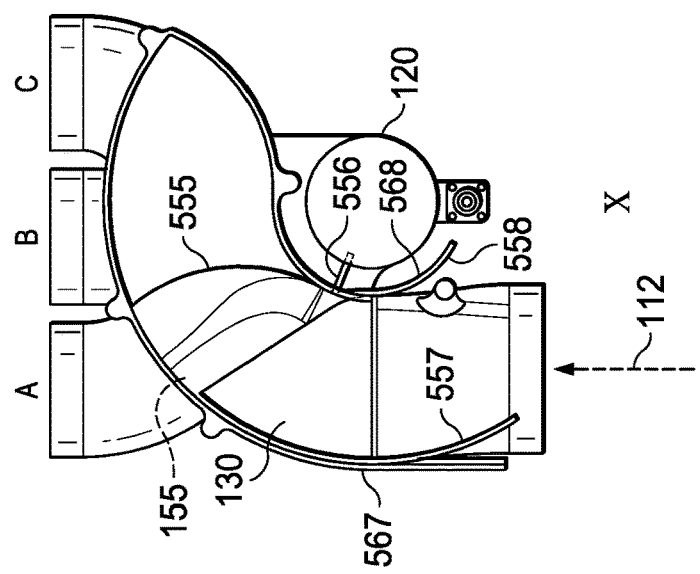

FIG. 5A shows still another example implementation of system 100 configured with capabilities and functionality in accordance with embodiments of the present disclosure. FIG. 5B shows a view of a scoop-shaped gate assembly configured with capabilities and functionality in accordance with embodiments of the present disclosure. FIGS. 5C-5E show diagrams illustrating operations of the example implementation of system 100 configured with capabilities and functionality in accordance with embodiments of the present disclosure. As shown in FIG. 5A, this implementation of system 100 may include gate assembly 150, actuator 120, housing 130, and plurality of outlets 170. The functionality of system 100 as illustrated in FIGS. 5A-5E is similar to the functionality of the example illustrated in FIGS. 1A-1D.

In this implementation, gate assembly 150 may be provided in a scoop shape configuration. In this configuration, housing 130 (and main chamber 151) may define a bent-cylinder design, in which main chamber 151 follows a rounded turn, and the plurality of outlets 170 is disposed along the edges of the rounded turn. In this example, gate assembly 150 may be disposed within housing 130 and may be configured to slide along the rounded turn to position gate opening 155 over the selected one or more outlets (e.g., the first set of outlets to which airflow 110 is to be distributed). As shown in FIG. 5B, gate opening 155 may be shaped as a scoop including a rigid gate 555 that is configured to be positioned over the first set of outlets and is shaped as a scoop to route the airflow toward opening 155 and prevent the airflow from flowing out of the rigid gate, except through gate opening 155. Gate assembly 150 may also include a flexible closeout 557 including functionality similar to gate wall 152, and may be configured to cover the second set of outlets (e.g., the outlets to which airflow 112 is not to flow) as gate opening 155 is positioned over the first set of outlets. Gate assembly 150 may also include gate slide 558 configured to slide along slide 568 to provide stability to gate assembly 150 while gate assembly swings from one position to another one. Gate assembly 150 may also include actuator coupler 556 configured to functionally couple gate assembly 150 to actuator 120. The scoop shape configuration of gate assembly 150 may provide a further reduction in backpressure within system 100. Additionally, the scoop shape configuration of gate assembly 150 may permit a design that is smaller than a round design.

During operation, as shown in FIGS. 5C-5E, airflow 112 may flow into main chamber 151 of housing 130. In configuration X of system 100, as shown in FIG. 5C, gate assembly 150 may be positioned such that gate opening 155 is positioned over outlet A, allowing airflow 112 to flow to outlet A alone. In particular, airflow 112 may be routed through rigid gate 555 to outlet A, while preventing airflow 112 to flow to outlets B or C.

In configuration Y of system 100, as shown in FIG. 5D, gate assembly 150 may be moved to be positioned such that gate opening 155 is positioned over outlet B, allowing airflow 112 to flow to outlet B alone. For example, actuator 120 may be activated to provide a rotational force against actuator coupler 556 causing gate assembly 150 to swing clockwise, as flexible closeout 557 slides within slide 567 and gate slide 558 slides within slide 568, and rigid gate 555 may be positioned over outlet B. As rigid gate is positioned over outlet B, flexible closeout is positioned over outlet A, which prevents airflow 112 from flowing into outlet A. In this configuration, airflow 112 may be routed through rigid gate 555 to outlet C, while airflow 112 is prevented from flowing to outlets A or C.

In configuration Z of system 100, as shown in FIG. 5E, gate assembly 150 may be moved to be positioned such that gate opening 155 is positioned over outlet C, allowing airflow 112 to flow to outlet C alone. For example, actuator 120 may be activated to provide a rotational force against actuator coupler 556 causing gate assembly 150 to swing clockwise, as flexible closeout 557 slides within slide 567 and gate slide 558 slides within slide 568, and rigid gate 555 may be positioned over outlet C. As rigid gate is positioned over outlet C, flexible closeout is positioned over outlets A and B, which prevents airflow 112 from flowing into outlets A and B. In this configuration, airflow 112 may be routed through rigid gate 555 to outlet C, while airflow 112 is prevented from flowing to outlets A or B.

Although not shown, gate assembly 150 may be rotated to position the rigid gate 555 such that gate opening 155 overlaps two adjacent outlets. For example, actuator 120 may be activated to provide a rotational force against actuator coupler 556 causing gate assembly 150 to swing and to position rigid gate 555 to overlap a portion of outlet B and a portion of outlet C. In this case, flexible cutout 557 may be positioned fully over outlet A and partially over outlet B, and gate opening 155 may be positioned partially over outlet B and partially over outlet C, in this case, airflow 112 may be routed through rigid gate 555 to outlets B and C, while airflow 112 is prevented from flowing to outlet A.

Figure 6:
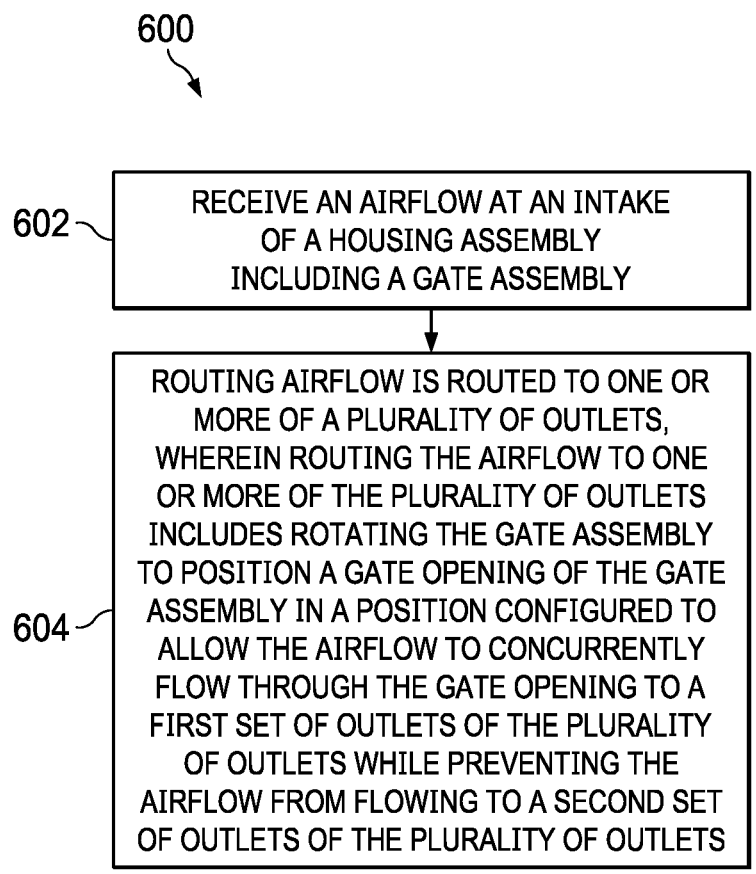
FIG. 6 is a high-level flow diagram of a method for distributing an airflow in accordance with embodiments of the present disclosure.

FIG. 6 is a high-level flow diagram of a method 600 for distributing an airflow in accordance with embodiments of the present disclosure. In embodiments, the steps of method 600 may be implemented using an airflow control system (e.g., system of FIGS. 1A-5B).

At block 602, an airflow is received at an intake of a housing assembly including a gate assembly. For example, in embodiments, an airflow (e.g., airflow 112 of FIGS. 1A-5B) provided by an airflow source (e.g., airflow source 110 of FIGS. 1A-5B) may be received at an intake of a housing (e.g., housing 130 of FIGS. 1A-5B) that may include a gate assembly (e.g., gate assembly 150 of FIGS. 1A-5B) according to configuration and functionality described with respect to embodiments of the present disclosure.

At block 604, the airflow is routed to one or more of a plurality of outlets. For example, in embodiments, the airflow (e.g., airflow 112 of FIGS. 1A-5B) may be routed using the gate assembly (e.g., gate assembly 150 of FIGS. 1A-5B)

to one or more of a plurality of outlets (e.g., plurality of outlets 170 of FIGS. 1A-5B) according to configuration and functionality described with respect to embodiments of the present disclosure. In embodiments, routing the airflow to one or more of the plurality of outlets includes rotating the gate assembly to position a gate opening of the gate assembly in a position configured to allow the airflow to concurrently flow through the gate opening to a first set of outlets of the plurality of outlets while preventing the airflow from flowing to a second set of outlets of the plurality of outlets.

Figure 7:
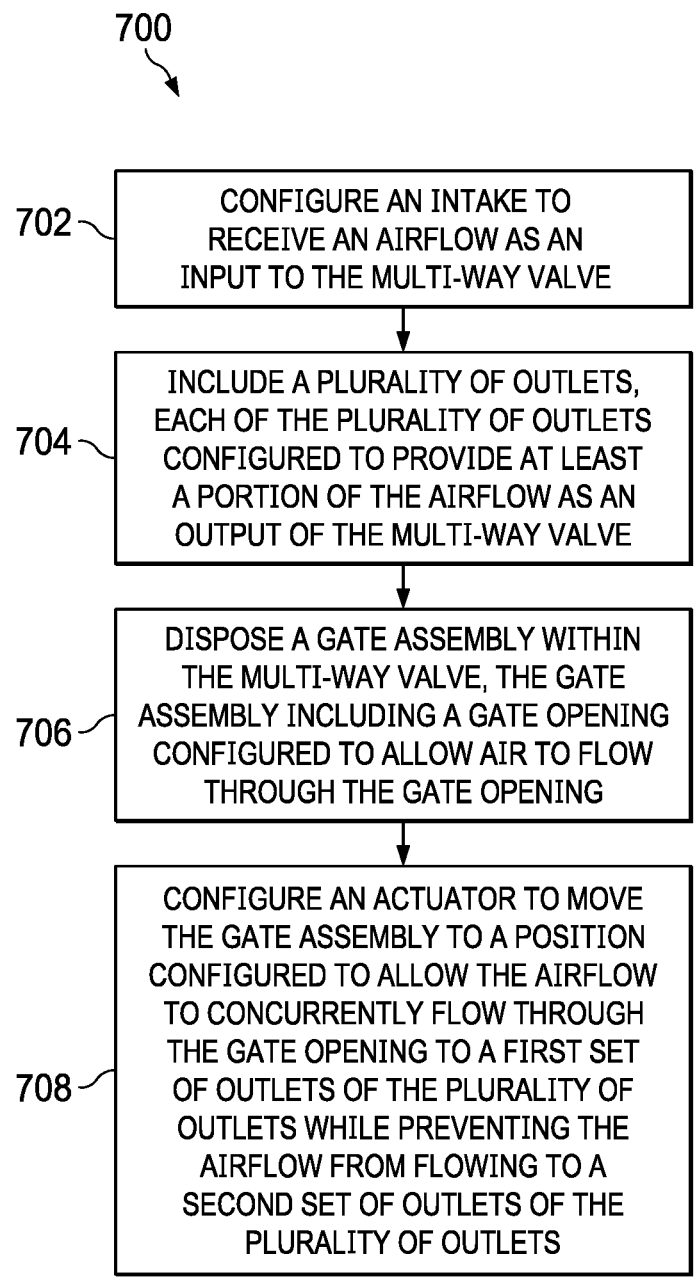
FIG. 7 shows a high-level flow diagram of exemplary operations for manufacturing a multi-way valve for airflow control configured in accordance with embodiments of the present disclosure.

A method of manufacturing a multi-way valve for airflow control in accordance with embodiments of the present disclosure will now be discussed with respect to FIG. 7. FIG. 7 shows an exemplary flow diagram 700 of operations for manufacturing a multi-way valve in accordance with embodiments of the present disclosure. For example, the steps illustrated in the example blocks shown in FIG. 700 may be performed to manufacture a multi-way valve for airflow control, as illustrated in FIGS. 1A-5B, according to embodiments herein.

At block 702, an intake is configured to receive an airflow as in input to the multi-way valve. For example, a housing (e.g., housing 130 of FIGS. 1A-5B) may be configured with an intake for receiving an airflow (e.g., airflow 112 of FIGS. 1A-5B) provided by an airflow source (e.g., airflow source 110 of FIGS. 1A-5B) according to configuration and functionality described with respect to embodiments of the present disclosure.

At block 704, a plurality of outlets is included, each of the plurality of outlets configured to provide at least a portion of the airflow as an output of the multi-way valve. For example, the housing (e.g., housing 130 of FIGS. 1A-5B) may include a plurality of outlets (e.g., plurality of outlets 170 of FIGS. 1A-5B) each configured to provide at least a portion of the airflow as an output of the multi-way valve according to configuration and functionality described with respect to embodiments of the present disclosure.

At block 706, a gate assembly is disposed within the multi-way valve. In embodiments, the gate assembly may include a gate opening configured to allow air to flow through the gate opening. For example, a gate assembly (e.g., gate assembly 150 of FIGS. 1A-5B) may be disposed within the housing and may include a gate opening (e.g., gate opening 155 of FIGS. 1A-5B) according to configuration and functionality described with respect to embodiments of the present disclosure.

At block 708, an actuator is configured to move the gate assembly to a position configured to allow the airflow to concurrently flow through the gate opening to a first set of outlets of the plurality of outlets while preventing the airflow from flowing to a second set of outlets of the plurality of outlets. For example, an actuator (e.g., actuator 120 of FIGS. 1A-5B) may be configured to move the gate assembly (e.g., gate assembly 150 of FIGS. 1A-5B) to a position configured to allow the airflow to concurrently flow through the gate opening to a first set of outlets of the plurality of outlets while preventing the airflow from flowing to a second set of outlets of the plurality of outlets according to configuration and functionality described with respect to embodiments of the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are in-tended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A multi-way valve for airflow control, comprising:
   an intake configured to receive an airflow as in input to the multi-way valve;
   a plurality of outlets, each of the plurality of outlets configured to provide at least a portion of the airflow as an output of the multi-way valve;
   a gate assembly including a gate opening configured to allow air to flow through the gate opening; and
   an actuator configured to move the gate assembly to a position configured to allow the airflow to concurrently flow through the gate opening to a first set of outlets of the plurality of outlets while preventing the airflow from flowing to a second set of outlets of the plurality of outlets, wherein the gate assembly defines an interior chamber allowing the airflow to flow from the intake to the gate opening, wherein the interior chamber has a scoop shape, and wherein the gate assembly includes one or more of:
a rigid gate opening;
a flexible closeout section;
a gate slide; and
an actuator coupler.

2. The multi-way valve of claim 1, wherein the gate assembly is configured to rotate with respect to a cross-sectional axis normal to the gate assembly.

3. The multi-way valve of claim 1, wherein the first set of outlets of the plurality of outlets includes a single outlet of the outlets of the plurality of outlets.

4. The multi-way valve of claim 1, wherein the first set of outlets of the plurality of outlets includes at least two outlets of the outlets of the plurality of outlets, and wherein the position configured to allow the airflow to concurrently flow through the gate opening to the first set of outlets is configured position the gate opening to overlap at least a portion of each of the at least two outlets.

5. The multi-way valve of claim 4, wherein the at least two outlets of the outlets of the plurality of outlets include one or more of:
at least two adjacent outlets; and
at least two non-adjacent outlets.

6. The multi-way valve of claim 4, wherein allowing the airflow to concurrently flow through the gate opening to the first set of outlets of the plurality of outlets includes allowing a first portion of the airflow to flow through the gate opening to a first one of the at least two outlets and a second portion of the airflow to flow through the gate opening to a second one of the at least two outlets.

7. The multi-way valve of claim 1, wherein the gate assembly includes a gate wall configured to prevent the airflow from flowing to the second set of outlets of the plurality of outlets.

8. The multi-way valve of claim 1, wherein, when the interior chamber is shaped as the partial cylinder, the gate assembly includes the gate wall having one or more ends as flexible tails.

9. A system for controlling an airflow, comprising:
an airflow source configured to provide an airflow to be routed to a set of outlets of a plurality of outlets;
an interface configured to allow selection of an airflow distribution mode from a plurality of airflow distribution modes, wherein each airflow distribution mode of the plurality of airflow distribution modes defines a different set of outlets of a plurality of outlets to which the airflow is to be distributed; and
a multi-way valve configured to route the airflow from the airflow source to a selected set of outlets of the plurality of outlets corresponding to the selected airflow distribution mode, wherein the multi-way valve includes:
a gate assembly including a gate opening configured to allow air to flow through the gate opening; and
an actuator configured to move the gate assembly to a position configured to allow the airflow to concurrently flow through the gate opening to the selected set of outlets of the plurality of outlets while preventing the airflow from flowing to a second set of outlets of the plurality of outlets, wherein the first set of outlets and the second set of outlets represent an entirety of the plurality of outlets, wherein the gate assembly defines an interior chamber allowing the airflow to flow from the intake to the gate opening, wherein the interior chamber has a scoop shape, and wherein the gate assembly includes one or more of:
a rigid gate opening;
a flexible closeout section;
a gate slide; and
an actuator coupler.

10. The system of claim 9, wherein the selected set of outlets of the plurality of outlets includes a single outlet of the outlets of the plurality of outlets.

11. The system of claim 9, wherein the selected set of outlets of the plurality of outlets includes at least two outlets of the outlets of the plurality of outlets, and wherein the position configured to allow the airflow to concurrently flow through the gate opening to the selected set of outlets is configured to position the gate opening to overlap at least a portion of each of the at least two outlets.

12. The system of claim 11, wherein the at least two outlets of the outlets of the plurality of outlets include one or more of:
at least two adjacent outlets; and
at least two non-adjacent outlets.

13. The system of claim 11, wherein allowing the airflow to concurrently flow through the gate opening to the selected set of outlets of the plurality of outlets includes allowing a first portion of the airflow to flow through the gate opening to a first one of the at least two outlets and a second portion of the airflow to flow through the gate opening to a second one of the at least two outlets.

14. A method of manufacturing a multi-way valve for airflow control, comprising:
configuring an intake to receive an airflow as in input to the multi-way valve;
including a plurality of outlets, each of the plurality of outlets configured to provide at least a portion of the airflow as an output of the multi-way valve;
disposing a gate assembly within the multi-way valve, the gate assembly including a gate opening configured to allow air to flow through the gate opening; and
configuring an actuator to move the gate assembly to a position configured to allow the airflow to concurrently flow through the gate opening to a first set of outlets of the plurality of outlets while preventing the airflow from flowing to a second set of outlets of the plurality of outlets, wherein the gate assembly defines an interior chamber allowing the airflow to flow from the intake to the gate opening, wherein the interior chamber has a scoop shape, and wherein the gate assembly includes one or more of:
a rigid gate opening;
a flexible closeout section;
a gate slide; and
an actuator coupler.

* * * * *